(12) United States Patent
Mun et al.

(10) Patent No.: US 12,707,168 B2
(45) Date of Patent: Aug. 11, 2026

(54) IMAGE SENSOR HAVING NANO-PHOTONIC LENS ARRAY AND ELECTRONIC APPARATUS INCLUDING THE IMAGE SENSOR

(71) Applicant: SAMSUNG ELECTRONICS CO., LTD., Suwon-si (KR)

(72) Inventors: Sangeun Mun, Suwon-si (KR); Hyunsung Park, Suwon-si (KR); Sookyoung Roh, Suwon-si (KR); Sungmo Ahn, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 50 days.

(21) Appl. No.: 18/806,246

(22) Filed: Aug. 15, 2024

(65) Prior Publication Data

US 2025/0106535 A1 Mar. 27, 2025

(30) Foreign Application Priority Data

Sep. 22, 2023 (KR) ........................ 10-2023-0127295

(51) Int. Cl.
*H04N 25/77* (2023.01)
*H04N 25/11* (2023.01)

(52) U.S. Cl.
CPC ............. *H04N 25/77* (2023.01); *H04N 25/11* (2023.01)

(58) Field of Classification Search
CPC .... H04N 25/11; H04N 25/77; H10F 39/8053; H10F 39/8063
See application file for complete search history.

(56) References Cited

U.S. PATENT DOCUMENTS

| | | | |
|---|---|---|---|
| 11,469,265 | B2 | 10/2022 | Arbabi et al. |
| 2008/0272454 | A1 | 11/2008 | Toshikiyo et al. |
| 2021/0048342 | A1 | 2/2021 | Kim et al. |

(Continued)

FOREIGN PATENT DOCUMENTS

| | | | |
|---|---|---|---|
| JP | 4531843 | B2 | 8/2010 |
| KR | 10-2634938 | B1 | 2/2024 |
| KR | 10-2024-0062757 | A | 5/2024 |

OTHER PUBLICATIONS

Communication issued Jan. 15, 2025 by the European Patent Office in European Patent Application No. 24194977.5.

*Primary Examiner* — Antoinette T Spinks
(74) *Attorney, Agent, or Firm* — Sughrue Mion, PLLC

(57) ABSTRACT

Provided is an image sensor including a sensor substrate including a first pixel group and a second pixel group, a nano-photonic lens array including a first region facing the first pixel group and a second region facing the second pixel group, and a color filter layer including a first color filter facing the first pixel group and the first region and transmitting light of a first wavelength band and a second color filter facing the second pixel group and the second region and transmitting light of a second wavelength band. The first region may include a plurality of nano-structures two-dimensionally arranged with a first arrangement period so as to condense incident light, the second region may include a plurality of nano-structures two-dimensionally arranged with a second arrangement period so as to condense incident light, and the second arrangement period may be less than the first arrangement period.

18 Claims, 26 Drawing Sheets

(56) References Cited

U.S. PATENT DOCUMENTS

| | | | |
|---|---|---|---|
| 2021/0167110 | A1* | 6/2021 | Roh .................... H10F 39/8023 |
| 2022/0208822 | A1 | 6/2022 | Yun et al. |
| 2022/0326415 | A1 | 10/2022 | Yun et al. |
| 2023/0020980 | A1 | 1/2023 | Mun et al. |
| 2023/0261019 | A1 | 8/2023 | Roh et al. |
| 2024/0145509 | A1 | 5/2024 | Mun et al. |
| 2024/0230960 | A1 | 7/2024 | Mun et al. |

* cited by examiner

FIG. 12

| | | COMPARATIVE EXAMPLE | EXAMPLE 1 | EXAMPLE 2 |
|---|---|---|---|---|
| Auto Focus Contrast Ratio | R | 2.41 | 2.44 | 2.44 |
| | G | 2.61 | 2.75 | 2.76 |
| | B | 2.16 | 2.36 | 2.36 |
| | AVERAGE | 2.39 | 2.51 | 2.52 |
| Ch.Diff (%) | | 26.50 | 47.34 | 11.58 |

IMAGE SENSOR HAVING NANO-PHOTONIC LENS ARRAY AND ELECTRONIC APPARATUS INCLUDING THE IMAGE SENSOR

CROSS-REFERENCE TO RELATED APPLICATION

This application is based on and claims priority under 35 U.S.C. § 119 to Korean Patent Application No. 10-2023-0127295, filed on Sep. 22, 2023, in the Korean Intellectual Property Office, the disclosure of which is incorporated by reference herein in its entirety.

BACKGROUND

1. Field

One or more embodiments relate to an image sensor including a nano-photonic lens array and an electronic apparatus including the image sensor.

2. Description of the Related Art

An image sensor includes a micro-lens array arranged on a color filter array so as to condense incident light on an individual photosensitive cell. A micro-lens array includes a plurality of micro-lenses arranged two-dimensionally. The plurality of micro-lenses in the micro-lens array may have, for example, a convex-lens shape for condensing light in a dioptric manner. Since it is difficult to manufacture dioptric micro-lenses in different shapes depending on locations on a micro-lens array, the plurality of micro-lenses in a micro-lens array have the same shape over the entire area of the micro-lens array. Therefore, it is difficult to address the differences in characteristics among different color channels and changes in sensor characteristics according to locations of a micro-lens array on an image sensor.

SUMMARY

Provided are an image sensor having an improved contrast ratio of an auto-focusing signal based on a nano-photonic lens array in the image sensor, and an electronic apparatus including the image sensor.

Provided are an image sensor having a reduced brightness difference between color channels based on a nano-photonic lens array in the image sensor, and an electronic apparatus including the image sensor.

Additional aspects will be set forth in part in the description which follows and, in part, will be apparent from the description, or may be learned by practice of the presented embodiments of the disclosure.

According to an aspect of the disclosure, there is provided an image sensor including: a sensor substrate including a first pixel group and a second pixel group, the first pixel group including a plurality of first pixels that are two-dimensionally arranged in a first direction and a second direction perpendicular the first direction, and second pixel group including a plurality of second pixels that are two-dimensionally arranged in the first direction and the second direction; a nano-photonic lens array including a first region and a second region, the first region facing the first pixel group in a third direction perpendicular the first direction and the second direction, and the second region facing the second pixel group in the third direction; and a color filter layer provided between the sensor substrate and the nano-photonic lens array, the color filter layer including a first color filter and a second color filter, the first color filter facing the first pixel group and the first region in the third direction and configured to transmit light of a first wavelength band, and the second color filter facing the second pixel group and the second region in the third direction and configured to transmit light of a second wavelength band that is different from the first wavelength band, wherein the first region includes a plurality of first nano-structures that are two-dimensionally arranged with a first period, wherein the second region includes a plurality of nano-structures that are two-dimensionally arranged with a second period, and wherein the second period is less than the first period.

Each of the first region and the second region may include a first lens, a second lens, a third lens, and a fourth lens arranged in a 2×2 array, each of the first lens, the second lens, the third lens, and the fourth lens in the first region may include a plurality of first nano-structures that are two-dimensionally arranged with the first period, and each of the first lens, the second lens, the third lens, and the fourth lens in the second region may include a plurality of second nano-structures that are two-dimensionally arranged with the second period.

In the first region, a first gap between a nano-structure arranged at an edge adjacent to the second lens in the first direction, from among the plurality of nano-structures in the first lens, and a nano-structure arranged at an edge adjacent to the first lens in the first direction, from among the plurality of nano-structures in the second lens, in the first direction may be greater than the first period, and a second gap between a nano-structure arranged at an edge adjacent to the fourth lens in the first direction, from among the plurality of nano-structures in the third lens, and a nano-structure arranged at an edge adjacent to the third lens in the first direction, from among the plurality of nano-structures in the fourth lens, in the first direction may be greater than the first period.

The first gap may be different from the second gap.

In the first region, a third gap between a nano-structure arranged at an edge adjacent to the third lens in the second direction, from among the plurality of nano-structures in the first lens, and a nano-structure arranged at an edge adjacent to the first lens in the second direction, from among the plurality of nano-structures in the third lens, in the second direction may be equal to the first period, and a fourth gap between a nano-structure arranged at an edge adjacent to the fourth lens in the second direction, from among the plurality of nano-structures in the second lens, and a nano-structure arranged at an edge adjacent to the second lens in the second direction, from among the plurality of nano-structures in the fourth lens, in the second direction may be equal to the first period.

In the first region, a third gap between a nano-structure arranged at an edge adjacent to the third lens in the second direction, from among the plurality of nano-structures in the first lens, and a nano-structure arranged at an edge adjacent to the first lens in the second direction, from among the plurality of nano-structures in the third lens, in the second direction may be different from the first period, and a fourth gap between a nano-structure arranged at an edge adjacent to the fourth lens in the second direction, from among the plurality of nano-structures in the second lens, and a nano-structure arranged at an edge adjacent to the second lens in the second direction, from among the plurality of nano-structures in the fourth lens, in the second direction may be different from the first period.

In the second region, a fifth gap between a nano-structure arranged at an edge adjacent to the second lens in the first direction, from among the plurality of nano-structures in the first lens, and a nano-structure arranged at an edge adjacent to the first lens in the first direction, from among the plurality of nano-structures in the second lens, in the first direction may be less than the second period, and a six gap between a nano-structure arranged at an edge adjacent to the fourth lens in the first direction, from among the plurality of nano-structures in the third lens, and a nano-structure arranged at an edge adjacent to the third lens in the first direction, from among the plurality of nano-structures in the fourth lens, in the first direction may be less than the second period.

The fifth gap may be different from the sixth gap.

In the second region, a seventh gap between a nano-structure arranged at an edge adjacent to the third lens in the second direction, from among the plurality of nano-structures in the first lens, and a nano-structure arranged at an edge adjacent to the first lens in the second direction, from among the plurality of nano-structures in the third lens, in the second direction may be less than the second period, and an eighth gap between a nano-structure arranged at an edge adjacent to the fourth lens in the second direction, from among the plurality of nano-structures in the second lens, and a nano-structure arranged at an edge adjacent to the second lens in the second direction, from among the plurality of nano-structures in the fourth lens, in the second direction may be less than the second period.

The seventh gap may be different from the eighth gap.

Each of the first pixel group and the second pixel group may include a first sub-group, a second sub-group, a third sub-group, and a fourth sub-group arranged in a 2×2 array, and each of the first sub-group, the second sub-group, the third sub-group, and the fourth sub-group in each of the first pixel group and the second pixel group may include a plurality of independent pixels arranged in a 2×2 array.

A first lens, a second lens, a third lens, and a fourth lens in the first region may be arranged respectively to face the first sub-group, the second sub-group, the third sub-group, and the fourth sub-group of the first pixel group in the third direction, and a first lens, a second lens, a third lens, and a fourth lens in the second region may be arranged respectively to face the first sub-group, the second sub-group, the third sub-group, and the fourth sub-group of the second pixel group in the third direction.

The sensor substrate may include a third pixel group and a fourth pixel group, the third pixel group including a plurality of third pixels that are two-dimensionally arranged in the first direction and the second direction, and the fourth pixel group including a plurality of fourth pixels that are two-dimensionally arranged in the first direction and the second direction, the nano-photonic lens array may include a third region and a fourth region, the third region facing the third pixel group in the third direction and the fourth region facing the fourth pixel group in the third direction, the color filter layer may include a third color filter and a fourth color filter, the third color filter facing the third pixel group and the third region in the third direction and configured to transmit light of a third wavelength band different from the first and second wavelength bands, and the fourth color filter facing the fourth pixel group and the fourth region in the third direction and configured to transmit light of the first wavelength band, the third region may include a plurality of nano-structures that are two-dimensionally arranged with a third period, the fourth region may include a plurality of nano-structures that are two-dimensionally arranged with a fourth period, and the second period is less than the third period and the fourth period.

The first period, the third period, and the fourth period may be equal to one another.

The first period and the fourth period may be less than the third period.

Each of the third region and the fourth region may include a first lens, a second lens, a third lens, and a fourth lens arranged in a 2×2 array, each of the first lens, the second lens, the third lens, and the fourth lens in the third region may include a plurality of nano-structures that are two-dimensionally arranged with the third period, and each of the first lens, the second lens, the third lens, and the fourth lens in the fourth region may include a plurality of nano-structures that are two-dimensionally arranged with the fourth period.

In the third region, a ninth gap between a nano-structure arranged at an edge adjacent to the second lens in the first direction, from among the plurality of nano-structures in the first lens, and a nano-structure arranged at an edge adjacent to the first lens in the first direction, from among the plurality of nano-structures in the second lens, in the first direction may be equal to the third period, a tenth gap between a nano-structure arranged at an edge adjacent to the fourth lens in the first direction, from among the plurality of nano-structures in the third lens, and a nano-structure arranged at an edge adjacent to the third lens in the first direction, from among the plurality of nano-structures in the fourth lens, in the first direction may be equal to the third period, an eleventh gap between a nano-structure arranged at an edge adjacent to the third lens in the second direction, from among the plurality of nano-structures in the first lens, and a nano-structure arranged at an edge adjacent to the first lens in the second direction, from among the plurality of nano-structures in the third lens, in the second direction may be equal to the third period, and a twelfth gap between a nano-structure arranged at an edge adjacent to the fourth lens in the second direction, from among the plurality of nano-structures in the second lens, and a nano-structure arranged at an edge adjacent to the second lens in the second direction, from among the plurality of nano-structures in the fourth lens, in the second direction may be equal to the third period.

In the fourth region, a thirteenth gap between a nano-structure arranged at an edge adjacent to the second lens in the first direction, from among the plurality of nano-structures in the first lens, and a nano-structure arranged at an edge adjacent to the first lens in the first direction, from among the plurality of nano-structures in the second lens, in the first direction may be equal to the fourth period, a fourteenth gap between a nano-structure arranged at an edge adjacent to the fourth lens in the first direction, from among the plurality of nano-structures in the third lens, and a nano-structure arranged at an edge adjacent to the third lens in the first direction, from among the plurality of nano-structures in the fourth lens, in the first direction may be equal to the fourth period, a fifteenth gap between a nano-structure arranged at an edge adjacent to the third lens in the second direction, from among the plurality of nano-structures in the first lens, and a nano-structure arranged at an edge adjacent to the first lens in the second direction, from among the plurality of nano-structures in the third lens, in the second direction may be greater than the fourth period, and a sixteenth gap between a nano-structure arranged at an edge adjacent to the fourth lens in the second direction, from among the plurality of nano-structures in the second lens, and a nano-structure arranged at an edge adjacent to the second lens in the second direction, from among the plurality of nano-structures in the fourth lens, in the second direction may be greater than the fourth period.

The plurality of first pixels may be grouped and arranged in a 2×2 array, the plurality of second pixels may be grouped and arranged in a 2×2 array, the first region may include a first lens facing all of the plurality of first pixels in the first pixel group, and the second region may include a second lens facing all of the plurality of second pixels in the second pixel group.

According to another aspect of the disclosure, there is provided an electronic apparatus including: a lens assembly configured to form an optical image of a subject; an image sensor configured to convert the optical image formed by the lens assembly into an electrical signal; and a processor configured to process a signal generated by the image sensor, wherein the image sensor may include: a sensor substrate including a first pixel group and a second pixel group, each of the first pixel group and the second pixel group including a plurality of pixels that are two-dimensionally arranged in a first direction and a second direction perpendicular the first direction; a nano-photonic lens array including a first region and a second region, the first region facing the first pixel group in a third direction perpendicular the first direction and the second direction, and the second region facing the second pixel group in the third direction; and a color filter layer provided between the sensor substrate and the nano-photonic lens array, the color filter layer including a first color filter and a second color filter, the first color filter facing the first pixel group and the first region in the third direction and configured to transmit light of a first wavelength band, and the second color filter facing the second pixel group and the second region in the third direction and configured to transmit light of a second wavelength band that is different from the first wavelength band, wherein the first region may include a plurality of first nano-structures that are two-dimensionally arranged with a first period, wherein the second region may include a plurality of nano-structures that are two-dimensionally arranged with a second period, and wherein the second period is less than the first period.

According to another aspect of the disclosure, there is provided an image sensor including: a sensor substrate including a first pixel group and a second pixel group, the first pixel group including a plurality of first pixels that are two-dimensionally arranged in a first direction and a second direction perpendicular the first direction, and second pixel group including a plurality of second pixels that are two-dimensionally arranged in the first direction and the second direction; a nano-photonic lens array including a first region overlapping the first pixel group in a third direction perpendicular the first direction and the second direction, and a second region overlapping the second pixel group in the third direction; and a color filter layer provided between the sensor substrate and the nano-photonic lens array, the color filter layer including a first color filter overlapping the first pixel group in the third direction, and the second color filter overlapping the second pixel group in the third direction, wherein the first region may include a plurality of first nano-structures and the second region may include a plurality of second nano-structures, wherein the plurality of first nano-structures are arranged in the first direction to have a first period, and wherein the plurality of second nano-structures are arranged in the first direction to have a second period different from the first period.

BRIEF DESCRIPTION OF DRAWINGS

The above and other aspects, features, and advantages of certain embodiments of the disclosure will be more apparent from the following description taken in conjunction with the accompanying drawings, in which:

FIG. 12 is a table showing an example of contrast ratios and brightness differences between channels in the comparative example, the first example structure, and the second example structure;

DETAILED DESCRIPTION

Figure 1:
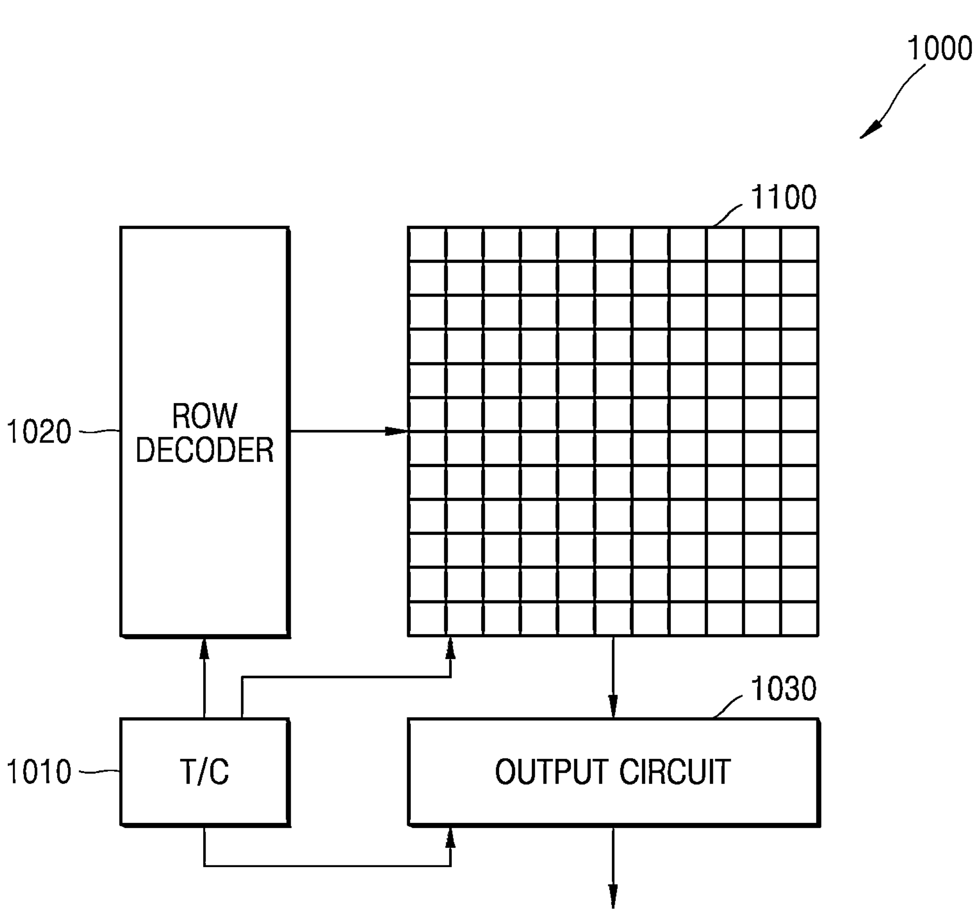
FIG. 1 is a schematic block diagram of an image sensor according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, an image sensor including a nano-photonic lens array and an electronic apparatus including the image sensor will be described in detail with reference to accompanying drawings. The embodiments of the disclosure are capable of various modifications and may be embodied in many different forms. In the drawings, like reference numerals denote like components, and sizes of components in the drawings may be exaggerated for convenience of explanation.

In a case in which a layer, a film, a region, or a panel is referred to as being "on" another element, it may be directly on/under/at left/right sides of the other layer or substrate, or intervening layers may also be present.

It will be understood that although the terms "first," "second," etc. may be used herein to describe various components, these components should not be limited by these terms. These components are only used to distinguish one component from another. These terms do not limit that materials or structures of components are different from one another.

An expression used in the singular encompasses the expression of the plural, unless it has a clearly different meaning in the context. It will be further understood that in a case in which a portion is referred to as "comprising" another component, the portion may not exclude another component but may further comprise another component unless the context states otherwise.

In addition, the terms such as " . . . unit", "module", etc. provided herein indicates a unit performing a function or operation, and may be realized by hardware, software, or a combination of hardware and software.

The use of the terms of "the above-described" and similar indicative terms may correspond to both the singular forms and the plural forms.

Also, the operation of all methods described herein may be performed in any suitable order unless otherwise indicated herein or otherwise clearly contradicted by context. Also, the use of all exemplary terms (for example, etc.) is only to describe a technical spirit in detail, and the scope of rights is not limited by these terms unless the context is limited by the claims.

FIG. 1 is a schematic block diagram of an image sensor according to an embodiment. Referring to FIG. 1, an image sensor 1000 may include a pixel array 1100, a timing controller (T/C) 1010, a row decoder 1020, and an output circuit 1030. The image sensor 1000 may be a charge-coupled device (CCD) image sensor or a complementary metal oxide semiconductor (CMOS) image sensor.

The pixel array 1100 includes pixels that are two-dimensionally provided in a plurality of rows and columns. The row decoder 1020 selects one of the rows in the pixel array 1100 based on a row address signal output from the timing controller 1010. For example, the row decoder 1020 may select one of the rows in the pixel array 1100 in response to a row address signal output from the timing controller 1010. The output circuit 1030 outputs a photosensitive signal, in a line unit, from a plurality of pixels provided in the selected row. For example, the output circuit 1030 may include a column decoder and an analog-to-digital converter (ADC). For example, the output circuit 1030 may include a plurality of ADCs that are provided respectively in columns between the column decoder and the pixel array 1100 or one ADC provided at an input end or an output end of the column decoder. The timing controller 1010, the row decoder 1020, and the output circuit 1030 may be implemented in one chip or in separate chips. Here, the chip may refer to an semiconductor chip or an integrated circuit (IC) chip. However, the disclosure is not limited thereto. A processor for processing an image signal output from the output circuit 1030 may be implemented in one chip together with the timing controller 1010, the row decoder 1020, and the output circuit 1030. However, the disclosure is not limited thereto, and as such, the processor may be provided in a separate chip.

Figure 2A:
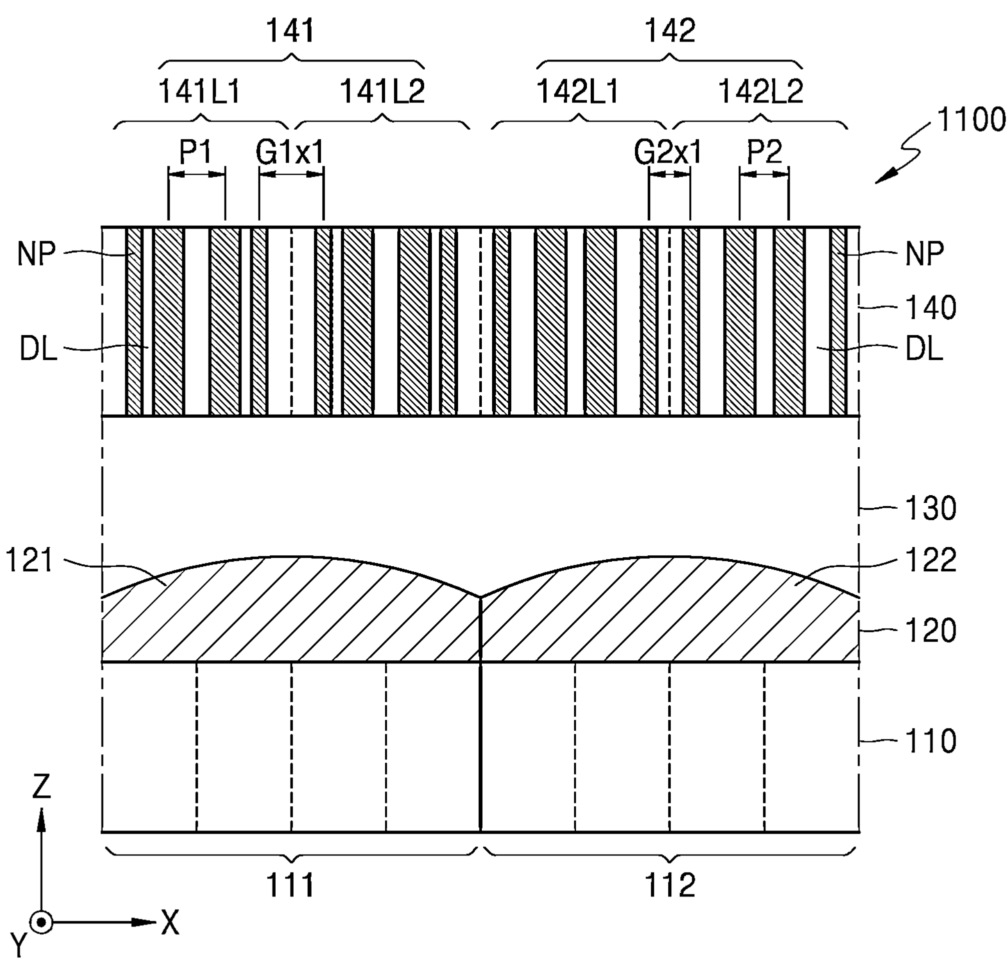
FIGS. 2A and 2B are cross-sectional views schematically showing a structure of a pixel array in an image sensor according to an embodiment.
Figure 2B:
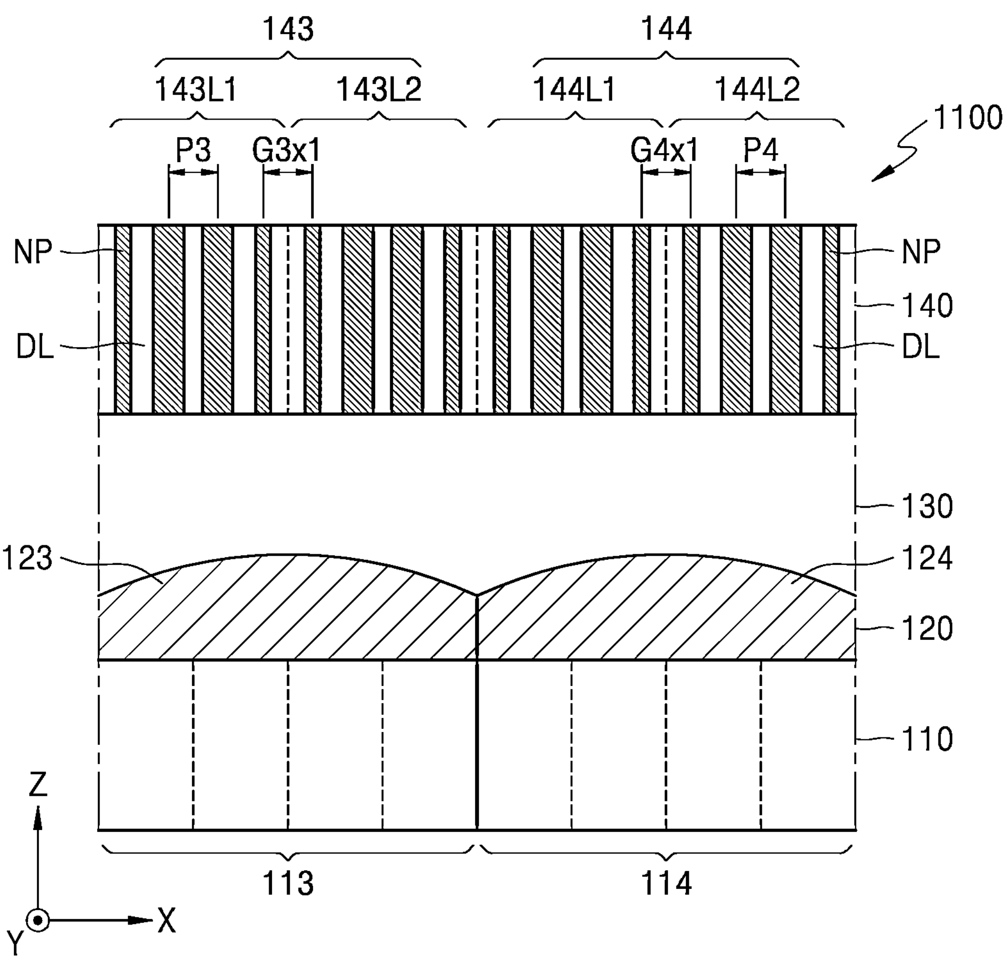

FIGS. 2A and 2B are cross-sectional views schematically showing a structure of the pixel array 1100 in the image sensor 1000 according to an embodiment. FIG. 2A shows a cross-section of the pixel array 1100 taken along a first direction (X-direction) at a first location, and FIG. 2B shows a cross-section of the pixel array 1100, taken along the first direction (X-direction) at a second location different from the first location in a second direction (Y-direction) perpendicular to the first direction. Referring to FIGS. 2A and 2B, the pixel array 1100 may include a sensor substrate 110, a color filter layer 120 provided on the sensor substrate 110, a planarization layer 130 that is provided on the color filter layer 120, and a nano-photonic lens array 140 provided on the planarization layer 130. The color filter layer 120 may be provided between the sensor substrate 110 and the nano-photonic lens array 140 in a third direction (that is, Z-direction) perpendicular to the first and second directions, and the planarization layer 130 may be provided between the color filter layer 120 and the nano-photonic lens array 140 in the third direction.

Figure 3:
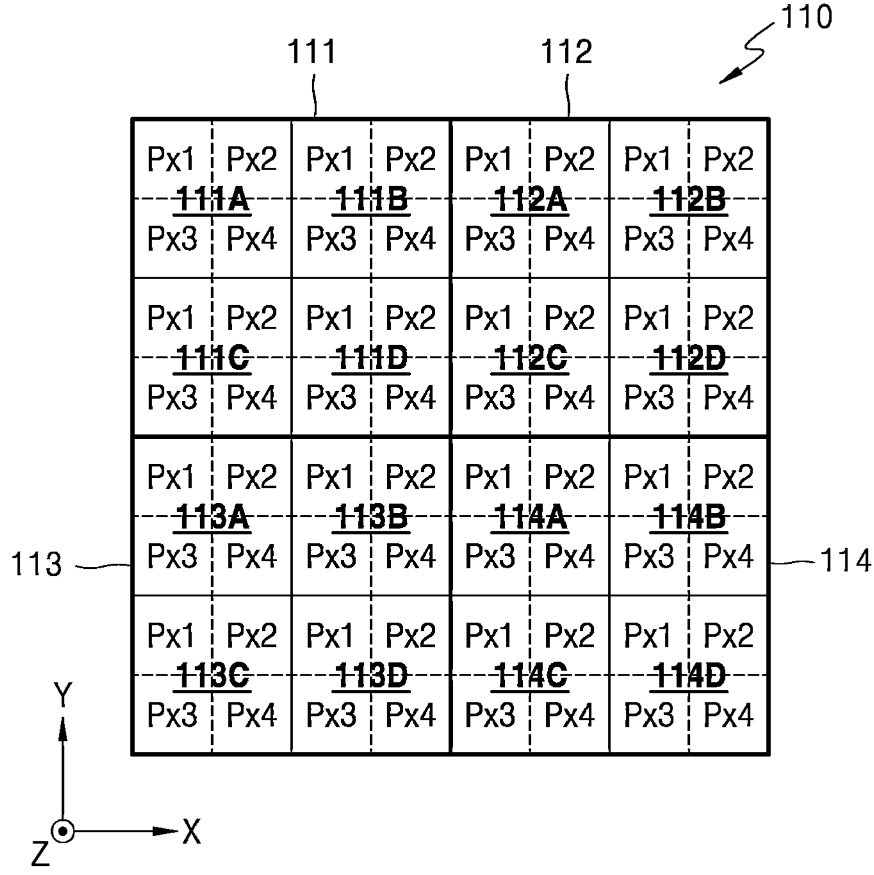
FIG. 3 is a plan view schematically showing an example structure of one unit pixel array in a sensor substrate according to an embodiment.

FIG. 3 is a plan view schematically showing an example structure of a unit pixel array in the sensor substrate 110 according to an embodiment. Referring to FIG. 3, one unit pixel array of the sensor substrate 110 may include a first pixel group 111, a second pixel group 112, a third pixel group 113, and a fourth pixel group 114. The first to fourth pixel groups 111, 112, 113, and 114 may be two-dimensionally arranged in a 2×2 array in the first and second directions. However, the disclosure is not limited thereto. For example, although FIG. 3 only shows one pixel unit array, a plurality of first pixel groups 111 and a plurality of second pixel groups 112 may be alternately arranged in the first direction, and a plurality of third pixel groups 113 and a plurality of fourth pixel groups 114 may be alternately arranged in the first direction in a cross-section at different location in the second direction perpendicular to the first direction. Also, the plurality of first pixel groups 111 and the plurality of fourth pixel groups 114 may be provided in a first diagonal direction and the plurality of second pixel groups 112 and the plurality of third pixel groups 113 may be provided in a second diagonal direction crossing the first diagonal direction.

Each of the first to fourth pixel groups 111, 112, 113, and 114 may include sub-groups that are grouped and two-dimensionally arranged in a 2×2 array in the first and second directions. For example, the first pixel group 111 may include a first sub-group 111A, a second sub-group 111B, a third sub-group 111C, and a fourth sub-group 111D that are grouped and two-dimensionally arranged in a 2×2 array in the first and second directions. The first sub-group 111A may be in contact with the second sub-group 111B in the first direction and may be in contact with the third sub-group 111C in the second direction. The second sub-group 111B may be in contact with the fourth sub-group 111D in the second direction and the third sub-group 111C may be in contact with the fourth sub-group 111D in the first direction. Also, the second pixel group 112 may include a first sub-group 112A, a second sub-group 112B, a third sub-group 112C, and a fourth sub-group 112D that are grouped and two-dimensionally arranged in a 2×2 array in the first and second directions, the third pixel group 113 may include a first sub-group 113A, a second sub-group 113B, a third sub-group 113C, and a fourth sub-group 113D that are grouped and two-dimensionally arranged in a 2×2 array in the first and second directions, and the fourth pixel group 114 may include a first sub-group 114A, a second sub-group 114B, a third sub-group 114C, and a fourth sub-group 114D that are grouped and two-dimensionally arranged in a 2×2 array in the first and second directions.

Also, each of the plurality of sub-groups 111A, 111B, 111C, 111D, 112A, 112B, 112C, 112D, 113A, 113B, 113C, 113D, 114A, 114B, 114C, and 114D may include a plurality of independent pixels that are grouped and two-dimensionally arranged in a 2×2 array in the first and second directions. For example, each of the plurality of sub-groups 111A, 111B, 111C, 111D, 112A, 112B, 112C, 112D, 113A, 113B, 113C, 113D, 114A, 114B, 114C, and 114D may include a first pixel Px1, a second pixel Px2, a third pixel Px3 and a fourth pixel and Px4 that are grouped and two-dimensionally arranged in a 2×2 array in the first and second directions. The first pixel Px1 may be adjacent to the second pixel Px2 in the first direction and may be adjacent to the third pixel Px3 in the second direction. The second pixel Px2 may be adjacent to the fourth pixel Px4 in the second direction and the third pixel Px3 may be adjacent to the fourth pixel Px4 in the first direction. For example, the first pixel Px1 may be in contact with the second pixel Px2 in the first direction and may be in contact with the third pixel Px3 in the second direction, and the second pixel Px2 may be in contact with the fourth pixel Px4 in the second direction and the third pixel Px3 may be in contact with the fourth pixel Px4 in the first direction. Each of the first to fourth pixels Px1, Px2, Px3, and Px4 may independently sense incident light. Therefore, each of the plurality of sub-groups 111A, 111B, 111C, 111D, 112A, 112B, 112C, 112D, 113A, 113B, 113C, 113D, 114A, 114B, 114C, and 114D may include four pixels that are grouped and two-dimensionally arranged in a 2×2 array in the first and second directions. Also, each of the first to fourth pixel groups 111, 112, 113, and 114 may include sixteen pixels that are grouped and arranged in a 4×4 array in the first and second directions.

Figure 4:
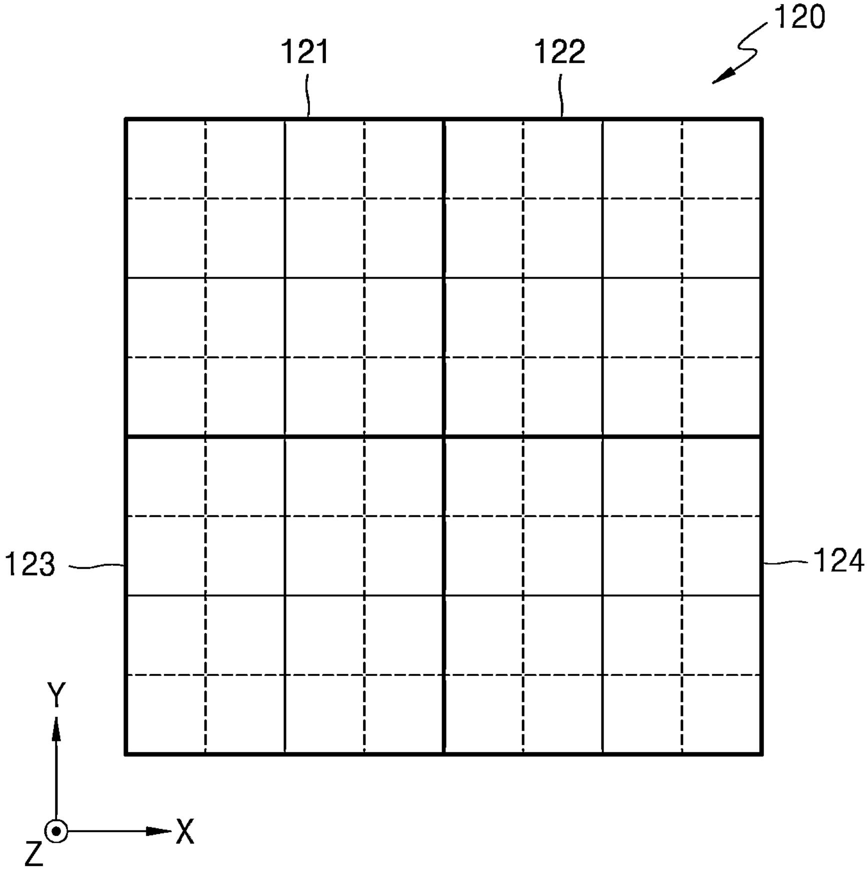
FIG. 4 is a plan view schematically showing an example structure of a unit filter array in a color filter layer according to an embodiment.

FIG. 4 is a plan view schematically showing an example structure of one unit filter array in the color filter layer 120 according to an embodiment. Referring to FIG. 4, the color filter layer 120 may include a plurality of color filters that are provided between the sensor substrate 110 and the nano-photonic lens array 140. The plurality of color filters may be configured to transmit light of a certain wavelength band and absorb light of another wavelength band. For example, one unit filter array of the color filter layer 120 may include a first color filter 121 that transmits light of a first wavelength band and absorbs light of another wavelength band, a second color filter 122 that transmits light of a second wavelength band that is different from the first wavelength band and absorbs light of another wavelength band, a third color filter 123 that transmits light of a third wavelength band that is different from the first and second wavelength bands and absorbs light of another wavelength band, and a fourth color filter 124 that transmits light of the first wavelength band and absorbs light of another wavelength band. For example, the first color filter 121 may be configured to transmit light of a first wavelength band and absorb light of another wavelength band different from the first wavelength, the second color filter 122 may be configured to transmit light of a second wavelength band that is different from the first wavelength band and absorb light of another wavelength band different from the second wavelength band, the third color filter 123 may be configured to transmit light of a third wavelength band that is different from the first and second wavelength bands and absorb light of another wavelength band different from the third wavelength band, and the fourth color filter 124 is configured to transmit light of the first wavelength band and absorb light of another wavelength band different from the first wavelength band. The first to fourth color filters 121, 122, 123, and 124 may be grouped and two-dimensionally arranged in a 2×2 array in the first and second directions. For example, the first color filter 121 may be adjacent to the second color filter 122 in the first direction and may be adjacent to the third color filter 123 in the second direction. The second color filter 122 may be adjacent to the fourth color filter 124 in the second direction and the third color filter 123 may be adjacent to the fourth color filter 124 in the first direction. For example, the first color filter 121 may be in contact with the second color filter 122 in the first direction and may be in contact with the third color filter 123 in the second direction. The second color filter 122 may be in contact with the fourth color filter 124 in the second direction and the third color filter 123 may be in contact with the fourth color filter 124 in the first direction.

FIG. 4 shows an example of a unit filter array corresponding to one unit Bayer pattern. According to an embodiment, a plurality of first color filters 121 and a plurality of second color filters 122 may be alternately provided in the first direction, and a plurality of third color filters 123 and a plurality of fourth color filters 124 may be alternately provided in the first direction on a cross-section that is at a different location in the second direction that is perpendicular to the first direction. Also, a plurality of first color filters 121 and a plurality of fourth color filters 124 may be arranged in a first diagonal direction, and a plurality of second color filters 122 and a plurality of third color filters 123 may be arranged in a second diagonal direction crossing the first diagonal direction.

Referring to FIGS. 2A and 2B, the first color filter 121 may be provided to face the first pixel group 111 in a third direction (Z-direction), the second color filter 122 may be provided to face the second pixel group 112 in the third direction, the third color filter 123 may be provided to face the third pixel group 113 in a third direction, and the fourth color filter 124 may be provided to face the fourth pixel group 114 in the third direction. Accordingly, the plurality of pixels in the first pixel group 111 may sense the light of a first wavelength band that has passed through the first color filter 121. The plurality of pixels in the second pixel group 112 may sense the light of a second wavelength band that has passed through the second color filter 122, the plurality of pixels in the third pixel group 113 may sense the light of a third wavelength band that has passed through the third color filter 123, and the plurality of pixels in the fourth pixel group 114 may sense the light of a first wavelength band that has passed through the fourth color filter 124.

For example, the first color filter 121 and the fourth color filter 124 may be green color filters transmitting the green light, the second color filter 122 may be a blue color filter transmitting the blue light, and the third color filter 123 may be a red color filter transmitting the red light. In this case, the first pixel group 111 and the fourth pixel group 114 may be green pixel groups configured to sense green light, the second pixel group 112 may be a blue pixel group configured to sense blue light, and the third pixel group 113 may be a red pixel group configured to sense red light. In another example, the first color filter 121 and the fourth color filter 124 may be yellow color filters transmitting yellow-based light, the second color filter 121 may be a blue color filter, and the third color filter 123 may be a red color filter. In another example, the first color filter 121 and the fourth color filter 124 may be yellow color filters, the second color filter 122 may be a cyan color filter, and the third color filter 123 may be a magenta color filter.

In FIG. 4, dashed lines may represent isolation layers among the first to fourth pixels Px1, Px2, Px3, and Px4. As shown in FIG. 4, the first to fourth color filters 121, 122, 123, and 124 may be provided to face all the pixels in the first to fourth pixel groups 111, 112, 113, and 114. For example, the first to fourth color filters 121, 122, 123, and 124 may be provided respectively corresponding to the first to fourth pixel groups 111, 112, 113, and 114 in the third direction. For example, in the third direction, the first color filter 121 overlaps all pixels in the first pixel group 111, the second color filter 122 overlaps all pixels in the second pixel group 112, the third color filter 123 overlaps all pixels in the third pixel group 113, and the fourth color filter 124 overlaps all pixels in the fourth pixel group 114. For example, the first color filter 121 covers all pixels in the first pixel group 111, the second color filter 122 covers all pixels in the second pixel group 112, the third color filter 123 covers all pixels in the third pixel group 113, and the fourth color filter 124 covers all pixels in the fourth pixel group 114.

The first to fourth color filters 121, 122, 123, and 124 in the color filter layer 120 may be formed of, for example, an organic polymer material. For example, the first to fourth color filters 121, 122, 123, and 124 may include a coloring agent, binder resin, polymer photoresist, etc. The first and fourth color filters 121 and 124 may be organic color filters including green organic dye or a green organic pigment as a coloring agent, the second color filter 122 may be an organic color filter including a blue organic dye or a blue organic pigment as a coloring agent, and the third color filter 123 may be an organic color filter including a red organic dye or a red organic pigment as a coloring agent. According to an embodiment, the color filter layer 120 may further include a black matrix arranged at boundaries between the first to fourth color filters 121, 122, 123, and 124. The black matrix may include, for example, carbon black.

Referring back to FIGS. 2A and 2B, the planarization layer 130 arranged between the color filter layer 120 and the nano-photonic lens array 140 may provide a flat surface for forming the nano-photonic lens array 140 on the planarization layer 130. The planarization layer 130 may include an organic polymer material that is suitable for being stacked on the color filter layer 120 that is formed of an organic material and may easily form a flat surface. The organic polymer material forming the planarization layer 130 may be transparent with respect to visible light. For example, the planarization layer 130 may include at least one organic polymer material from an epoxy resin, polyimide, polycarbonate, polyacrylate, and polymethyl methacrylate (PMMA). The planarization layer 130 may be formed on the color filter layer 120 by, for example, a spin coating method, and may have a flat upper surface through a thermal treatment.

The nano-photonic lens array 140 may be provided on the planarization layer 130. FIGS. 2A and 2B show that the nano-photonic lens array 140 is directly provided on the planarization layer 130, but the disclosure is not limited thereto. As such, according to another embodiment, one or more other layers may be formed between the nano-photonic lens array 140 and the planarization layer 130. For example, a protective layer may be provided on the planarization layer 130, and the nano-photonic lens array 140 may be provided on the protective layer. The protective layer may be configured to prevent damage to the planarization layer 130 that may occur during the process of forming the nano-photonic lens array 140. That is, the protective layer may be prevent damage to the organic polymer material of the planarization layer 130 that may occur during the process of forming the nano-photonic lens array 140. Also, in order to protect the planarization layer 130 while forming the nano-photonic lens array 140, an etch stop layer may be further arranged between the planarization layer 130 and the nano-photonic lens array 140.

Figure 5:
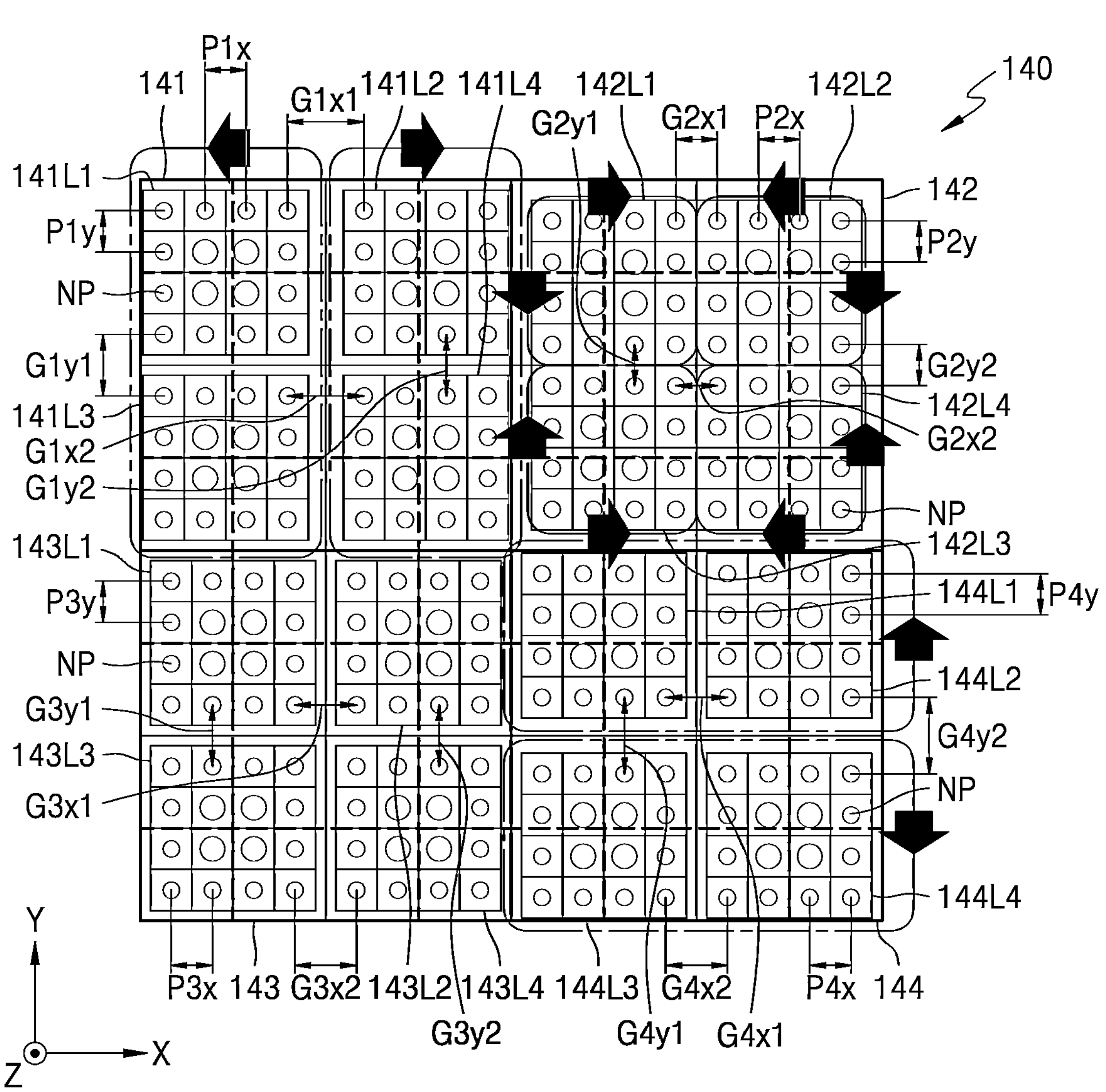
FIG. 5 is a plan view schematically showing an example structure of a unit pattern in a nano-photonic lens array according to an embodiment.

FIG. 5 is a plan view schematically showing an example structure of a unit pattern in the nano-photonic lens array 140 according to an embodiment. Referring to FIG. 5, one unit pattern of the nano-photonic lens array 140 may include a first region 141, a second region 142, a third region 143, and a fourth region 144. The first region 141, the second region 142, the third region 143, and the fourth region 144 may be grouped and two-dimensionally arranged in a 2×2 array in the first and second directions. For example, the first region 141 may be adjacent to the second region 142 in the first direction and may be adjacent to the third region 143 in the second direction. The second region 142 may be adjacent to the fourth region 144 in the second direction and the third region 143 may be adjacent to the fourth region 144 in the first direction. For example, the first region 141 may be in contact with the second region 142 in the first direction and may be in contact with the third region 143 in the second direction. The second region 142 may be in contact with the fourth region 144 in the second direction and the third region 143 may be in contact with the fourth region 144 in the first direction.

Although FIG. 5 only shows one unit pattern as an example, a plurality of first regions 141 and a plurality of second regions 142 may be alternately arranged in the first direction and a plurality of third region 143 and a plurality of fourth regions 144 may be alternately arranged in the first direction on a cross-section at different location in the second direction. Also, the plurality of first regions 141 and the plurality of fourth regions 144 may be arranged in a first diagonal direction, and the plurality of second regions 141 and the plurality of third regions 143 may be arranged in a second diagonal direction crossing the first diagonal direction.

Referring to FIGS. 2A and 2B, the first region 141 may be provided to face the first pixel group 111 and the first color filter 121 in the third direction. The second region 142 may be provided to face the second pixel group 112 and the second color filter 122 in the third direction. The third region 143 may be provided to face the third pixel group 113 and the third color filter 123 in the third direction, the fourth region 144 may be provided to face the fourth pixel group 114 and the fourth color filter 124 in the third direction.

Each of the first region 141, the second region 142, the third region 143, and the fourth region 144 may include a plurality of lenses that are grouped and two-dimensionally arranged in a 2×2 array in the first and second directions. For example, the first region 141 may include a first lens 141L1, a second lens 141L2, a third lens 141L3, and a fourth lens 141L4 that are two-dimensionally arranged. The first lens 141L1 may be adjacent to a second lens 142L2 in the first direction and a third lens 143L3 in the second direction, the second lens 142L2 may be adjacent to a fourth lens 144L4 in the second direction, and the third lens 143L3 may be adjacent to the fourth lens 144L4 in the first direction. For example, the first lens 141L1 may be in contact with a second lens 142L2 in the first direction and a third lens 143L3 in the second direction, the second lens 142L2 may be in contact with a fourth lens 144L4 in the second direction, and the third lens 143L3 may be in contact with the fourth lens 144L4 in the first direction. Also, the second region 142 may include a first lens 142L1, a second lens 142L2, a third lens 142L3, and a fourth lens 142L4 that are two-dimensionally arranged. The third region 143 may include a first lens 143L1, a second lens 143L2, a third lens 143L3, and a fourth lens 143L4 that are two-dimensionally arranged. Also, the fourth region 144 may include a first lens 144L1, a second lens 144L2, a third lens 144L3, and a fourth lens 144L4 that are two-dimensionally arranged.

The first lens 141L1, the second lens 141L2, the third lens 141L3, and the fourth lens 141L4 in the first region 141 may respectively face the first sub-group 111A, the second sub-group 111B, the third sub-group 111C, and the fourth sub-group 111D of the first pixel group 111. For example, the first lens 141L1 of the first region 141 may face all of the pixels in the first sub-group 111A of the first pixel group 111, the second lens 141L2 of the first region 141 may face all of the pixels in the second sub-group 111B of the first pixel group 111, the third lens 141L3 of the first region 141 may face all of the pixels in the third sub-group 111C of the first pixel group 111, and the fourth lens 141L4 of the first region 141 may face all of the pixels in the fourth sub-group 111D of the first pixel group 111 in the third direction. For example, dashed lines indicated in FIG. 5 show the isolation layers among the pixels.

The first lens 142L1, the second lens 142L2, the third lens 142L3, and the fourth lens 142L4 of the second region 142 may be respectively arranged to face the first sub-group 112A, the second sub-group 112B, the third sub-group 112C, and the fourth sub-group 112D of the second pixel group 112. Therefore, the first lens 142L1 of the second region 142 may face all pixels in the first sub-group 112A of the second pixel group 112, the second lens 142L2 of the second region 142 may face all pixels in the second sub-group 112B of the second pixel group 112, the third lens 142L3 of the second region 142 may face all pixels in the third sub-group 112C of the second pixel group 112, and the fourth lens 142L4 of the second region 142 may face all pixels in the fourth sub-group 112D of the second pixel group 112 in the third direction.

The first lens 143L1, the second lens 143L2, the third lens 143L3, and the fourth lens 143L4 of the third region 143 may be respectively arranged to face the first sub-group 113A, the second sub-group 113B, the third sub-group 113C, and the fourth sub-group 113D of the third pixel group 113. Therefore, the first lens 143L1 of the third region 143 may face all of the pixels in the first sub-group 113A of the third pixel group 113, the second lens 143L2 of the third region 143 may face all of the pixels in the second sub-group 113B of the third pixel group 113, the third lens 143L3 of the third region 143 may face all of the pixels in the third sub-group 113C of the third pixel group 113, and the fourth lens 143L4 of the third region 143 may face all of the pixels in the fourth sub-group 113D of the third pixel group 113 in the third direction.

The first lens 144L1, the second lens 144L2, the third lens 144L3, and the fourth lens 144L4 of the fourth region 144 may be respectively arranged to face the first sub-group 114A, the second sub-group 114B, the third sub-group 114C, and the fourth sub-group 114D of the fourth pixel group 114. Therefore, the first lens 144L1 of the fourth region 144 may face all of the pixels in the first sub-group 114A of the fourth pixel group 114, the second lens 144L2 of the fourth region 144 may face all of the pixels in the second sub-group 114B of the fourth pixel group 114, the third lens 144L3 of the fourth region 144 may face all of the pixels in the third sub-group 114C of the fourth pixel group 114, and the fourth lens 144L4 of the fourth region 144 may face all of the pixels in the fourth sub-group 114D of the fourth pixel group 114 in the third direction.

The plurality of lenses of the nano-photonic lens array 140 may condense incident light on the respective sub-groups. For example, each of the first lens 141L1, the second lens 141L2, the third lens 141L3, and the fourth lens 141L4 of the first region 141 may condense the incident light on to a corresponding sub-group from among the first sub-group 111A, the second sub-group 111B, the third sub-group 111C, and the fourth sub-group 111D of the first pixel group 111. For example, in the light condensed by the first lens 141L1, the second lens 141L2, the third lens 141L3, and the fourth lens 141L4 of the first region 141, the green light may only pass through the first color filter 121 and may respectively reach the first sub-group 111A, the second sub-group 111B, the third sub-group 111C, and the fourth sub-group 111D of the first pixel group 111.

Each of the first lens 142L1, the second lens 142L2, the third lens 142L3, and the fourth lens 142L4 of the second region 142 may condense the incident light on to a corresponding sub-group from among the first sub-group 112A, the second sub-group 112B, the third sub-group 112C, and the fourth sub-group 112D of the second pixel group 112. For example, in the light condensed by the first lens 142L1, the second lens 142L2, the third lens 142L3, and the fourth lens 142L4 of the second region 142, the blue light may only pass through the second color filter 122 and may respectively reach the first sub-group 112A, the second sub-group 112B, the third sub-group 112C, and the fourth sub-group 112D of the second pixel group 112.

Each of the first lens 143L1, the second lens 143L2, the third lens 143L3, and the fourth lens 143L4 of the third region 143 may condense the incident light on to a corresponding sub-group from among the first sub-group 113A, the second sub-group 113B, the third sub-group 113C, and the fourth sub-group 113D of the third pixel group 113. In particular, in the light condensed by the first lens 143L1, the second lens 143L2, the third lens 143L3, and the fourth lens 143L4 of the third region 143, the red light may only pass through the third color filter 123 and may respectively reach the first sub-group 113A, the second sub-group 113B, the third sub-group 113C, and the fourth sub-group 113D of the third pixel group 113.

Each of the first lens 144L1, the second lens 144L2, the third lens 144L3, and the fourth lens 144L4 of the fourth region 144 may condense the incident light on to a corresponding sub-group from among the first sub-group 114A, the second sub-group 114B, the third sub-group 114C, and the fourth sub-group 114D of the fourth pixel group 114. In particular, in the light condensed by the first lens 144L1, the second lens 144L2, the third lens 144L3, and the fourth lens 144L4 of the fourth region 144, the green light may only pass through the fourth color filter 124 and may respectively reach the first sub-group 114A, the second sub-group 114B, the third sub-group 114C, and the fourth sub-group 114D of the fourth pixel group 114.

Each of the plurality of lenses in the nano-photonic lens array 140 may have a nano-pattern structure configured to condense incident light. For example, each of the plurality of lenses in the nano-photonic lens array 140 may include a plurality of nano-structures NP that are periodically and two-dimensionally arranged in the first and second directions so as to change a phase of the incident light. According to an embodiment, one or more of the shapes, sizes (width, heights), arrangement period, arrangement type, etc. of the plurality of nano-structures NP may be determined so that the light immediately after passing through each of the plurality of lenses may have a certain phase profile. A focal length of the light after passing through each of the plurality of lenses may be determined according to the phase profile. The term "arrangement period" may indicate a period between two adjacent nano-structure NP, and as such, the term "period" may be used instead of "arrangement period".

The nano-structures NP may be nano-pillars, and cross-sectional widths or diameters of the nano-structures NP may have dimensions of a sub-wavelength. The sub-wavelength refers to a wavelength that is less than a wavelength band of the light condensed by the nano-photonic lens array 140. In an example case in which the incident light is a visible ray, the cross-sectional diameter of the nano-structure NP may be less than, for example, 400 nm, 300 nm, or 200 nm. A height of the nano-structure NP may be about 300 nm to about 1500 nm, which is greater than the cross-sectional diameter of the nano-structure.

The nano-structures NP may include a material having a relatively higher refractive index as compared with a peripheral material and having a relatively lower absorption ratio in the visible ray band as compared with the peripheral material. Here, the peripheral material may refer to material peripheral to the nano-structures NP or surrounding the nano-structures NP. For example, the nano-structures NP may include c-Si, p-Si, a-Si and a Group III-V compound semiconductor (GaP, GaN, GaAs etc.), SiC, $TiO_2$, $SiN_3$, ZnS, ZnSe, $Si_3N_4$, and/or a combination thereof. Periphery of the nano-structures NP may be filled with a dielectric material DL having a relatively lower refractive index as compared with the nano-structures NP and have a relatively low absorption ratio in the visible ray band as compared with the peripheral material. For example, the periphery of the nano-structures NP may be filled with siloxane-based spin on glass (SOG), $SiO_2$, $Si_3N_4$, $Al_2O_3$, air, etc.

The refractive index of a high-refractive index nano-structures NP may be about 2.0 or greater with respect to the light of about 630 nm wavelength, and the refractive index of a low-refractive index dielectric material DL may be about 1.0 to about 2.0 or less with respect to the light of about 630 nm wavelength. Also, a difference between the refractive indexes of the nano-structures NP and the refractive index of the dielectric material DL may be about 0.5 or greater. The nano-structures NP having a difference in a refractive index between the refractive index of the peripheral material may change the phase of light that passes through the nano-structures NP. The change in the phase of light that passes through the nano-structures NP is caused by phase delay that occurs due to the shape dimension of the sub-wavelength of the nanostructures NP, and a degree at which the phase is delayed may be determined based on shape, dimension and/or arrangement period of the nano-structures NP.

The plurality of lenses of the nano-photonic lens array 140 may respectively have nano-pattern structures having similar arrangement types of the plurality of nano-structures NP. For example, the plurality of lenses may have the same number of nano-structures NP. FIG. 5 shows an example in which the plurality of nano-structures NP are two-dimensionally arranged in a 4×4 array in the first and second directions in each of the plurality of lenses, but is not limited thereto. For example, the nano-structures NP arranged in a 3×3 array or 5×5 array or greater may be two-dimensionally arranged in each of the plurality of lenses.

In addition, in FIG. 5, a rectangular grating indicated by thin solid lines in each of the plurality of lenses is shown to make the arrangement of the nano-structures NP understood easily, and is not an actual element of the nano-photonic lens array 140. The arrangement of the nano-structures NP may be designed based on the rectangular gratings shown in FIG. 5. FIG. 5 shows an example of rectangular gratings formed in a 4×4 matrix form in the first and second directions, but the shape of the gratings in which the nano-structures NP are arranged is not limited thereto and may be variously selected. For example, the grating in which the nano-structures NP are arranged may be formed in a tetragonal lattice in the diagonal direction or a radial-shape lattice.

Also, FIG. 5 shows that the nano-structures NP at the same locations in the plurality of lenses of the nano-photonic lens array 140 have the same size (width or diameter), but one or more embodiments are not limited thereto. For example, widths and diameters of the nano-structures NP arranged in the first lens 141L1, the second lens 141L2, the third lens 141L3, and the fourth lens 141L4 of the first lens region 141 and widths and diameters of the nano-structures NP arranged in the first lens 144L1, the second lens 144L2, the third lens 144L3, and the fourth lens 144L4 of the fourth lens region 144 are determined in consideration of the focal length of the green light. Moreover, widths and diameters of the nano-structures NP arranged in the first lens 142L1, the second lens 142L2, the third lens 142L3, and the fourth lens 142L4 of the second lens region 142 are determined in consideration of the focal length of the blue light. Furthermore, widths and diameters of the nano-structures NP arranged in the first lens 143L1, the second lens 143L2, the third lens 143L3, and the fourth lens 143L4 of the third lens region 143 may be determined in consideration of the focal length of the red light.

According to an embodiment, in order for each of the plurality of lenses in the nano-photonic lens array 140 to condense the incident light, the nano-structures NP may be configured so that the transmitted light immediately after passing through each of the plurality of lenses may have a convex phase profile. To this end, from among the plurality of nano-structures NP, the nano-structure NP arranged at the center region in each of the plurality of lenses may have the largest width or diameter, and the widths or the diameters of the nano-structures NP may be reduced away from the center of each of the plurality of lenses. In an example case in which the nano-structures NP are arranged in a 4×4 array in each of the plurality of lenses, the widths or diameters of four nano-structures NP at the center portion may be equal to one another, and the widths or diameters of twelve remaining nano-structures NP arranged along the edges may be less than those of the four nano-structures NP at the center portion.

However, the nano-structures NP arranged in the region having a relatively small phase delay do not necessarily have relatively smaller diameters. In an example case in which a phase delay in a certain region is $3\pi$, the phase delay is optically the same as the remaining $\pi$ after removing $2\pi$. Therefore, in a case in which the diameter of the nano-structure NP is so small and is difficult to be manufactured, the width or diameter of the nano-structure NP may be selected so as to implement the delay phase increased by $2\pi$. In an example case in which the width or diameter of the nano-structure NP for achieving the phase delay of $0.5\pi$ is too small, the width or diameter of the nano-structure NP may be selected so as to achieve the phase delay of $2.5\pi$.

In addition, because each of the plurality of lenses in the nano-photonic lens array 140 condenses the incident light on the plurality of pixels in the corresponding sub-group, an auto-focusing signal may be obtained from a difference between output signals from adjacent pixels in one sub-group. For example, an auto-focusing signal in the first direction may be generated from a difference between an output signal from the first pixel Px1 and an output signal from the second pixel Px2, a difference between an output signal from the third pixel Px3 and an output signal from the fourth pixel Px4, or a difference between a sum of output signals from the first pixel Px1 and the third pixel Px3 and a sum of output signals from the second pixel Px2 and the fourth pixel Px4. Also, an auto-focusing signal in the second direction may be generated from a difference between an output signal from the first pixel Px1 and an output signal from the third pixel Px3, a difference between an output signal from the second pixel Px2 and an output signal from the fourth pixel Px4, or a difference between a sum of output signals from the first pixel Px1 and the second pixel Px2 and a sum of output signals from the third pixel Px3 and the fourth pixel Px4.

A general image signal may be obtained in various ways according to an image processing algorithm. According to an embodiment, outputs from each of the pixels in the first pixel group 111 may be treated as an individual green image signal, outputs from each of the pixels in the second pixel group 112 may be treated as an individual blue image signal, outputs from each of the pixels in the third pixel group 113 may be treated as an individual red image signal, and outputs from each of the pixels in the fourth pixel group 114 may be treated as an individual green image signal. In this case, 16 independent image signals may be obtained from one pixel group.

According to another embodiment, a sum of outputs from the pixels arranged in one sub-group may be treated as one image signal. For example, outputs from the pixels in the first sub-group 111A of the first pixel group 111 may be summed to generate one green image signal, outputs from the pixels in the second sub-group 111B may be summed to generate one green image signal, outputs from the pixels in the third sub-group 111C may be summed to generate one green image signal, and outputs from the pixels in the fourth sub-group 111D may be summed to generate one green image signal. Likewise, outputs from the pixels in each of the first sub-group 112A, the second sub-group 112B, the third sub-group 112C, and the fourth sub-group 112D of the second pixel group 112 may be summed to generate a blue image signal, outputs from the pixels in each of the first sub-group 113A, the second sub-group 113B, the third sub-group 113C, and the fourth sub-group 113D of the third pixel group 113 may be summed to generate a red image signal, and outputs from the pixels in each of the first sub-group 114A, the second sub-group 114B, the third sub-group 114C, and the fourth sub-group 114D of the fourth pixel group 114 may be summed to generate a green image signal. In this case, 4 independent image signals may be obtained from one pixel group.

According to another embodiment, a sum of outputs from the pixels arranged in one pixel group may be treated as one image signal. For example, outputs from all the pixels in the first pixel group 111 may be summed to generate one green image signal, outputs from all the pixels in the second pixel group 112 may be summed to generate one blue image signal, outputs from all the pixels in the third pixel group 113 may be summed to generate one red image signal, and outputs from all the pixels in the fourth pixel group 114 may be summed to generate one green image signal. In this case, one independent image signal may be obtained from one pixel group.

In an example case in which the arrangement of the nano-structures NP is the same in all of the lenses in the nano-photonic lens array 140, a contrast ratio of the auto-focusing signal with respect to the blue light may degrade because a wavelength of the blue light is shorter than a wavelength of the red light and a wavelength of the green light. According to an embodiment, in order to improve a contrast ratio of the auto-focusing signal with respect to the blue light having the shortest wavelength, an arrangement period of the plurality of nano-structures NP in the lenses arranged in the second region 142 corresponding to the second color filter 122 that is the blue color filter, from among the lenses in the nano-photonic lens array 140, may be set to be less than an arrangement period of the plurality of nano-structures NP in other lenses.

Referring to FIG. 5, for example, in each of the first lens 141L1, the second lens 141L2, the third lens 141L3, and the fourth lens 141L4 of the first region 141, the plurality of nano-structures NP may be periodically arranged with a 1x arrangement period P1x in the first direction and with a 1y arrangement period P1y in the second direction. In an example case in which the plurality of nano-structures NP are arranged in a grating of a square shape, the 1x arrangement period P1x and the 1y arrangement period P1y may be equal to each other. However, in an example case in which the plurality of nano-structures NP are arranged in a grating of a rectangular shape, the 1x arrangement period P1x and the 1y arrangement period P1y may be different from each other. In each of the first lens 142L1, the second lens 142L2, the third lens 142L3, and the fourth lens 142L4 of the second region 142, the plurality of nano-structures NP may be periodically arranged with a 2x arrangement period P2x in the first direction and with a 2y arrangement period P2y in the second direction. In each of the first lens 143L1, the second lens 143L2, the third lens 143L3, and the fourth lens 143L4 of the third region 143, the plurality of nano-structures NP may be periodically arranged with a 3x arrangement period P3x in the first direction and with a 3y arrangement period P3y in the second direction. In each of the first lens 144L1, the second lens 144L2, the third lens 144L3, and the fourth lens 144L4 of the fourth region 144, the plurality of nano-structures NP may be periodically arranged with a 4x arrangement period P4x in the first direction and with a 4y arrangement period P4y in the second direction. According to the arrangement type of the plurality of nano-structures NP, the 2x arrangement period P2x and the 2y arrangement period P2y may be equal to or different from each other, the 3x arrangement period P3x and the 3y arrangement period P3y may be equal to or different from each other, and the 4x arrangement period P4x and the 4y arrangement period P4y may be equal to or different from each other. Here, 1x may be referred to as a first x arrangement period, and 1y may be referred to a first y arrangement period, 2x may be referred to as a second x arrangement period, and 2y may be referred to a second y arrangement period, 3x may be referred to as a third x arrangement period, and 3y may be referred to a third y arrangement period, 4x may be referred to as a fourth x arrangement period, and 4y may be referred to a fourth y arrangement period.

According to an embodiment, the 1x arrangement period P1x, the 3x arrangement period P3x, and the 4x arrangement period P4x in the first direction are equal to one another, and the 2x arrangement period P2x may be less than the 1x arrangement period P1x, the 3x arrangement period P3x, and the 4x arrangement period P4x (that is, $P2x<P1x=P3x=P4x$). Here, the period between the nano-structures may be defined as a distance between centers in the cross-sections of the nano-structures. For example, the 2x arrangement period P2x may be about 0.8 or more and about 0.95 or less times the 1x arrangement period P1x, the 3x arrangement period P3x, and the 4x arrangement period P4x. For example, $(0.8*P1x) \le P2x \le (0.95\ P1x)$. Likewise, the 1y arrangement period P1y, the 3y arrangement period P3y, and the 4y arrangement period P4y in the second direction may be equal to one another, and the 2y arrangement period P2y may be less than the 1y arrangement period P1y, the 3y arrangement period P3y, and the 4y arrangement period P4y (that is, $P2y<P1y=P3y=P4y$). For example, the 2y arrangement period P2y may be about 0.8 or more and about 0.95 or less times the 1y arrangement period Ply, the 3y arrangement period P3y, and the 4y arrangement period P4y. For example, $(0.8*P1y) \le P2y \le (0.95\ P1y)$.

According to another embodiment, because the wavelength of the green light is shorter than that of the red light, in order to improve the contrast ratio of the auto-focusing signal with respect to the green light, in the first and fourth regions 141 and 144 corresponding to the first and fourth color filters 121 and 124 that are the green color filters, the 1x, 1y, 4x, and 4y arrangement periods P1x, P1y, P4x, and P4y of the plurality of nano-structures NP in the lenses may be set to be less than the 3x and 3y arrangement periods P3x and P3y of the plurality of nano-structures NP in the lenses arranged in the third region 143 corresponding to the third color filter 123 that is the red color filter (that is, $P2x<P1x=P4x<P3x$, $P2y<P1y=P4y<P3y$). In other words, the 3x and 3y arrangement periods P3x and P3y of the plurality of nano-structures NP in the third region 143 corresponding to the light of third wavelength band (that is, red light) are the largest, the 1x, 1y, 4x, and 4y arrangement periods P1x, P1y, P4x, and P4y of the plurality of nano-structures NP in the first and fourth regions 141 and 144 corresponding to the light of first wavelength band (that is, green light) shorter than the third wavelength band are less than the 3x and 3y arrangement periods P3x and P3y, and the 2x and 2y arrangement periods P2x and P2y of the plurality of nano-structures NP in the second region 142 corresponding to the light of a second wavelength band (that is, blue light) shorter than the first wavelength band may be the smallest. For example, the 1x and 4x arrangement periods P1x and P4x may each be about 0.9 or more and below 1 time the 3x arrangement period P3x, and the 1y and 4y arrangement periods Ply and P4y may be each about 0.9 or more and below 1 time the 3y arrangement period P3y.

According to an embodiment, even in an example case in which the light of uniform intensity is incident on the entire area of the image sensor, the total intensity of the incident light incident on each of the first pixel group 111, the second pixel group 112, the third pixel group 113, and the fourth pixel group 114 may be different from one another. Also, in each of the first pixel group 111, the second pixel group 112, and the fourth pixel group 114, the distribution of the intensity of the incident light incident on the plurality of pixels may not be uniform. According to an embodiment, in order to set the total amounts of incident light incident respectively on the first pixel group 111, the second pixel group 112, the third pixel group 113, and the fourth pixel group 114 to be relatively uniform and in order to make the intensity distribution of the incident light incident on the pixels arranged in the first pixel group 111, the second pixel group 112, and the fourth pixel group 114 to be relatively uniform, locations of the lenses in the first region 141, the second region 142, and the fourth region 144 may be adjusted.

For example, in the first region 141, the first lens 141L1 and the second lens 141L2 may be arranged away from each other in the first direction and the third lens 141L3 and the fourth lens 141L4 may be arranged away from each other in the first direction. In this case, a gap G1x1 in the first direction between the nano-structure arranged on the edge adjacent to the second lens 141L2 in the first direction, from among the plurality of nano-structures in the first lens 141L1, and the nano-structure arranged on the edge adjacent to the first lens 141L1 in the first direction, from among the plurality of nano-structures in the second lens 141L2, may be greater than the 1x arrangement period P1x. Here, the gap between the nano-structures may be defined as a distance between centers in the cross-sections of the nano-structures.

Also, the third lens 141L3 may be aligned while matching to the first lens 141L1 in the second direction, and the fourth lens 141L4 may be aligned while matching to the second lens 141L2 in the second direction. Therefore, a gap G1x2 in the first direction between the nano-structure arranged on the edge adjacent to the fourth lens 141L4 in the first direction, from among the plurality of nano-structures in the third lens 141L3, and the nano-structure arranged on the edge adjacent to the third lens 141L3 in the first direction, from among the plurality of nano-structures of the fourth lens 141L4, may be greater than the 1x arrangement period P1x. The gap G1x1 and the gap G1x2 may be equal to each other, for example, may be more than 1 and about 1.4 or less times the 1x arrangement period P1x or less.

In the first region 141, a distance between the first lens 141L1 and the third lens 141L3 in the second direction and a distance between the second lens 141L2 and the fourth lens 141L4 in the second direction may not be adjusted. In this case, a gap G1y1 in the second direction between the nano-structure arranged on the edge adjacent to the third lens 141L3 in the second direction, from among the plurality of nano-structures in the first lens 141L1, and the nano-structure arranged on the edge adjacent to the first lens 141L1 in the second direction, from among the plurality of nano-structures in the third lens 141L3, may be equal to the 1y arrangement period P1y. Therefore, all of the nano-structures in the first lens 141L1 and the third lens 141L3 may be arranged at constant intervals in the second direction. Likewise, a gap G1y2 in the second direction between the nano-structure arranged on the edge adjacent to the fourth lens 141L4 in the second direction, from among the plurality of nano-structures in the second lens 141L2, and the nano-structure arranged on the edge adjacent to the second lens 141L2 in the second direction, from among the plurality of nano-structures in the fourth lens 141L4, may be equal to the 1y arrangement period Ply. Therefore, all of the nano-structures in the second lens 141L2 and the fourth lens 141L4 may be arranged at constant intervals in the second direction. Also, the first lens 141L1 may be aligned while matching to the second lens 141L2 in the first direction, and the third lens 141L3 may be aligned while matching to the fourth lens 141L4 in the first direction.

In the second region 142, the first lens 142L1, the second lens 142L2, the third lens 142L3, and the fourth lens 142L4 may be aligned to be adjacent to the center of the second region 142. In other words, the first lens 142L1, the second lens 142L2, the third lens 142L3, and the fourth lens 142L4 may be arranged to be adjacent to one another.

In this case, a gap G2x1 in the first direction between the nano-structure arranged on the edge adjacent to the second lens 142L2 in the first direction, from among the plurality of nano-structures in the first lens 142L1, and the nano-structure arranged on the edge adjacent to the first lens 142L1 in the first direction, from among the plurality of nano-structures in the second lens 142L2, may be less than the 2x arrangement period P2x. Also, the third lens 142L3 may be aligned while matching to the first lens 142L1 in the second direction, and the fourth lens 142L4 may be aligned while matching to the second lens 142L2 in the second direction. Therefore, a gap G2x2 in the first direction between the nano-structure arranged on the edge adjacent to the fourth lens 142L4 in the first direction, from among the plurality of nano-structures in the third lens 142L3, and the nano-structure arranged on the edge adjacent to the third lens 142L3 in the first direction, from among the plurality of nano-structures of the fourth lens 142L4, may be less than the 2x arrangement period P2x. The gap G2x1 and the gap G2x2 may be equal to each other, for example, may be about 0.6 or more and below 1 times the 2x arrangement period P2x or greater.

Also, a gap G2y1 in the second direction between the nano-structure arranged on the edge adjacent to the third lens 142L3 in the second direction, from among the plurality of nano-structures in the first lens 142L1, and the nano-structure arranged on the edge adjacent to the first lens 142L1 in the second direction, from among the plurality of nano-structures in the third lens 142L3, may be less than the 2y arrangement period P2y. The second lens 142L2 may be aligned while matching to the first lens 142L1 in the first direction, and the fourth lens 142L4 may be aligned while matching to the third lens 142L3 in the first direction. Therefore, a gap G2y2 in the second direction between the nano-structure arranged on the edge adjacent to the fourth lens 142L4 in the second direction, from among the plurality of nano-structures in the second lens 142L2, and the nano-structure arranged on the edge adjacent to the second lens 142L2 in the second direction, from among the plurality of nano-structures in the fourth lens 142L4, may be less than the 2y arrangement period P2y. The gap G2y1 and the gap G2y2 may be equal to each other, for example, may be about 0.6 or more and below 1 times the 2y arrangement period P2y or greater.

In the third region 143, the locations of the first lens 143L1, the second lens 143L2, the third lens 143L3, and the fourth lens 143L4 that may not be adjusted. In this case, all of the nano-structures in the first lens 143L1 and the second lens 143L2 are arranged in the first direction at constant intervals, all of the nano-structures in the third lens 143L3 and the fourth lens 143L4 are arranged in the first direction at constant intervals, all of the nano-structures in the first lens 143L1 and the third lens 143L3 are arranged in the second direction at constant intervals, and all of the nano-structures in the second lens 143L2 and the fourth lens 143L4 are arranged in the second direction at constant intervals. Also, the first lens 143L1 may be arranged to match with the third lens 143L3 in the second direction, the second lens 143L2 may be arranged to match with the fourth lens 143L4 in the second direction, the first lens 143L1 may be arranged to match with the second lens 143L2 in the first direction, and the third lens 143L3 may be arranged to match with the fourth lens 143L4 in the first direction.

In other words, a gap G3x1 in the first direction between the nano-structure arranged at the edge adjacent to the second lens 143L2 in the first direction, from among the plurality of nano-structures in the first lens 143L1, and the nano-structure arranged at the edge adjacent to the first lens 143L1 in the first direction, from among the plurality of nano-structures in the second lens 143L2, may be equal to the 3x arrangement period P3x, and a gap G3x2 in the first direction between the nano-structure arranged at the edge adjacent to the fourth lens 143L4 in the first direction, from among the nano-structures in the third lens 143L3, and the nano-structure arranged at the edge adjacent to the third lens 143L3 in the first direction, from among the plurality of nano-structures in the fourth lens 143L4, may be equal to the 3x arrangement period P3x. Also, a gap G3y1 in the second direction between the nano-structure arranged at the edge adjacent to the third lens 143L3 in the second direction, from among the plurality of nano-structures in the first lens 143L1, and the nano-structure arranged at the edge adjacent to the first lens 143L1 in the second direction, from among the plurality of nano-structures in the third lens 143L3, may be equal to the 3y arrangement period P3y, and a gap G3y2 in the second direction between the nano-structure arranged at the edge adjacent to the fourth lens 143L4 in the second direction, from among the nano-structures in the second lens 143L2, and the nano-structure arranged at the edge adjacent to the second lens 143L2 in the second direction, from among the plurality of nano-structures in the fourth lens 143L4, may be equal to the 3y arrangement period P3y.

In the fourth region 144, the first lens 144L1 and the third lens 144L3 may be arranged away from each other in the second direction, and the second lens 144L2 and the fourth lens 144L4 may be arranged away from each other in the second direction. In this case, a gap G4y1 in the second direction between the nano-structure arranged on the edge adjacent to the third lens 144L3 in the second direction, from among the plurality of nano-structures in the first lens 144L1, and the nano-structure arranged on the edge adjacent to the first lens 144L1 in the second direction, from among the plurality of nano-structures in the third lens 144L3, may be greater than the 4y arrangement period P4y. The second lens 144L2 may be aligned while matching to the first lens 144L1 in the first direction, and the fourth lens 144L4 may be aligned while matching to the third lens 144L3 in the first direction. Therefore, a gap G4y2 in the second direction between the nano-structure arranged on the edge adjacent to the fourth lens 144L4 in the second direction, from among the plurality of nano-structures in the second lens 144L2, and the nano-structure arranged on the edge adjacent to the second lens 144L2 in the second direction, from among the plurality of nano-structures in the fourth lens 144L4, may be greater than the 4y arrangement period P4y. The gap G4y1 and the gap G4y2 may be equal to each other, for example, may be more than 1 and about 1.4 or less times the 4y arrangement period P4y or less.

In the fourth region 144, a distance between the first lens 144L1 and the second lens 144L2 in the first direction and a distance between the third lens 144L3 and the fourth lens 144L4 in the first direction may not be adjusted. In this case, a gap G4x1 in the first direction between the nano-structure arranged on the edge adjacent to the second lens 144L2 in the first direction, from among the plurality of nano-structures in the first lens 144L1, and the nano-structure arranged on the edge adjacent to the first lens 144L1 in the first direction, from among the plurality of nano-structures in the second lens 144L2, may be equal to the 4x arrangement period P4x. Therefore, all of the nano-structures in the first lens 144L1 and the second lens 144L2 may be arranged at constant intervals in the first direction. Likewise, a gap G4x2 in the first direction between the nano-structure arranged on the edge adjacent to the fourth lens 144L4 in the first direction, from among the plurality of nano-structures in the third lens 144L3, and the nano-structure arranged on the edge adjacent to the third lens 144L3 in the first direction, from among the plurality of nano-structures in the fourth lens 144L4, may be equal to the 4x arrangement period P4x. Therefore, all of the nano-structures in the third lens 144L3 and the fourth lens 144L4 may be arranged at constant intervals in the first direction. Also, the first lens 141L1 may be aligned while matching to the third lens 144L3 in the second direction, and the second lens 144L2 may be aligned while matching to the fourth lens 144L4 in the second direction.

Therefore, the arrangement of the nano-structures in the fourth region 144 are rotated by 90-degree angle with respect to the arrangement of the nano-structures in the first region 141. This is based on the arrangement structures in the second region 142 and the third region 143 around the first region 141 and the fourth region 144. For example, the second region 142 corresponding to the blue pixel group is arranged around the first direction of the first region 141 and the third region 143 corresponding to the red pixel group is arranged around the second direction of the first region 141, but the third region 143 corresponding to the red pixel group is arranged around the first direction of the fourth region 144 and the second region 142 corresponding to the blue pixel group is arranged around the second direction of the fourth region 144.

Figure 6A:
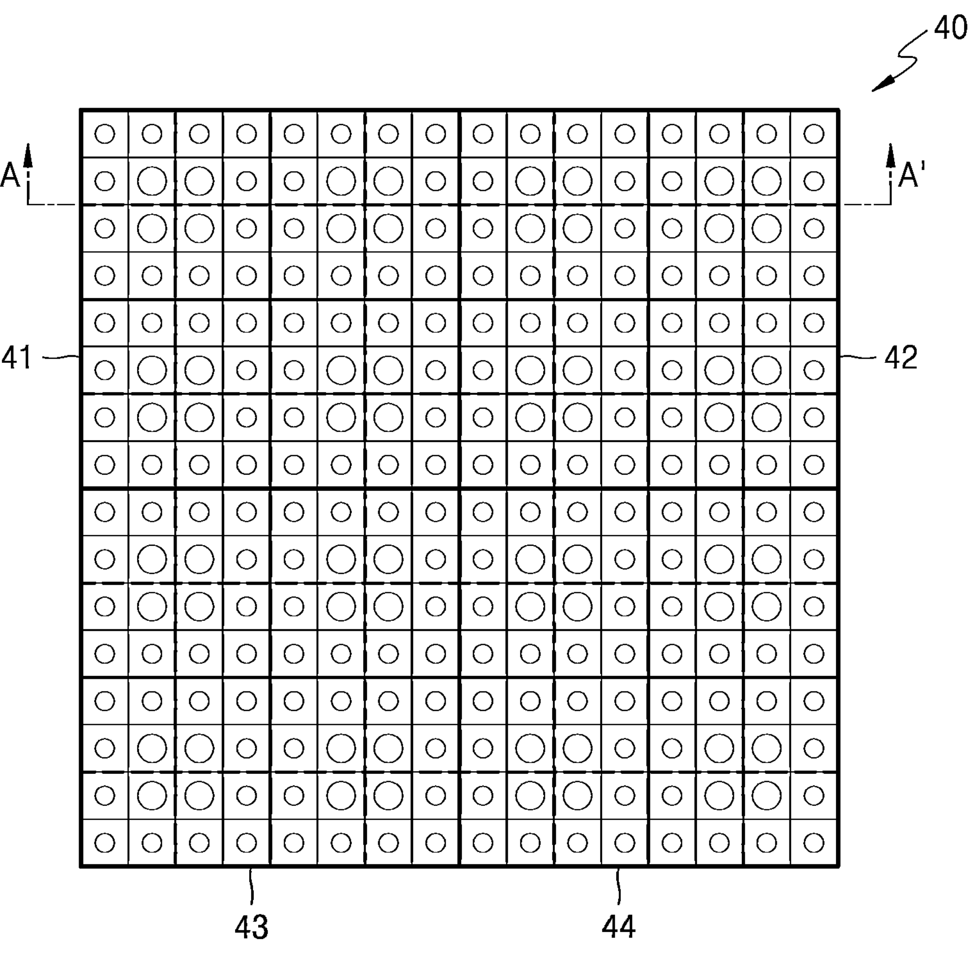
FIG. 6A is a plan view showing a structure of a unit pattern in a nano-photonic lens array according to a comparative example.
Figure 6B:
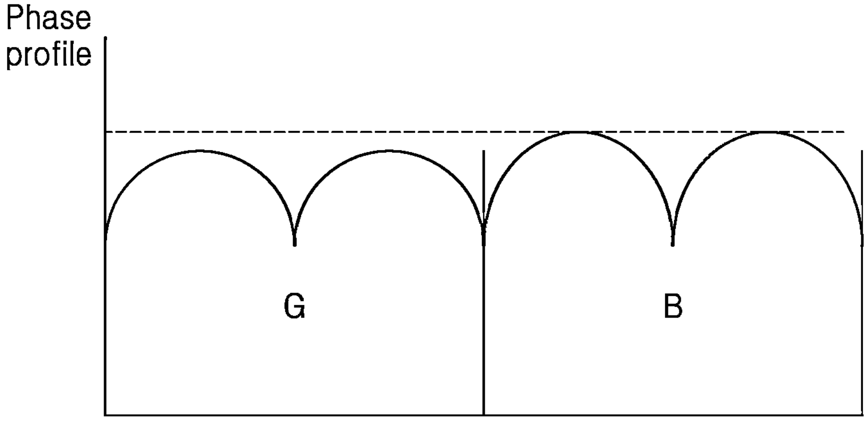
FIG. 6B is a diagram showing an example of a phase profile of transmitting light after passing through a nano-photonic lens array according to a comparative example.

FIG. 6A is a plan view showing a structure of one unit pattern in a nano-photonic lens array according to a comparative example, and FIG. 6B is a diagram showing an example of a phase profile of transmitting light after passing through a nano-photonic lens array according to a comparative example. Referring to FIG. 6A, in a nano-photonic lens array 40 according to the comparative example, the nano-structures are arranged with a constant period throughout the entire region of the nano-photonic lens array 40, and the nano-structures are aligned at constant intervals in the first and second directions. In other words, the arrangement periods of the nano-structures in a first region 41, a second region 42, a third region 43, and a fourth region 44 of the nano-photonic lens array 40 are equal to one another, and all the lenses in the first region 41, the second region 142, the third region 43, and the fourth region 44 are aligned to match with each other in the first and second directions.

FIG. 6B shows a phase profile of transmitted light on a cross-section obtained by cutting the center portion of the first region 41 and the second region 42 in line A-A' of FIG. 6A. For example, FIG. 6B shows a phase profile of green light in the light transmitted through the first region 41 and a phase profile of blue light in the light transmitted through the second region 42. As shown in FIG. 6B, the phase profile of the green light passing through the first region 41 and the phase profile of the blue light passing through the second region 42 may have convex lens shapes. Also, in an example case in which widths or diameters of the nano-structures NP arranged at corresponding positions in the first region 41 and the second region 42 are equal to each other, the phase profile of the blue light having a shorter wavelength than that of the green light may be more convex as compared with the phase profile of the green light having a longer wavelength than that of the blue light. In order for the phase profile of the green light and the phase profile of the blue light to have the same convex shapes, widths or diameters of the nano-structures NP in the second region 42 may be selected to be different from those of the corresponding nano-structures NP in the first region 41.

Figure 7:
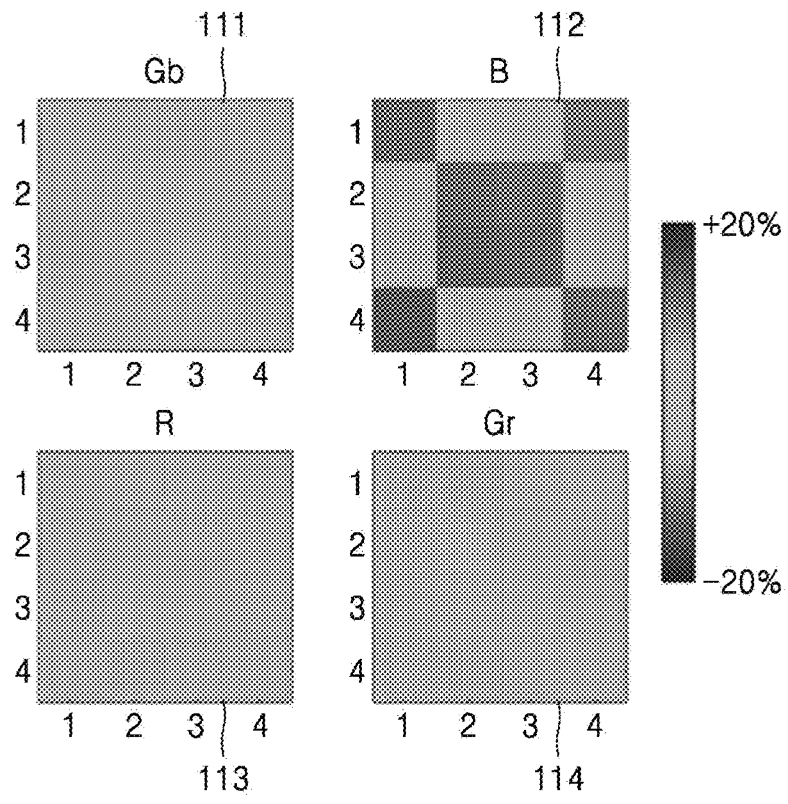
FIG. 7 is a diagram showing a simulation result showing an example of a distribution of intensity of light incident on a plurality of pixels on a sensor substrate when a nano-photonic lens array according to a comparative example is used.

FIG. 7 is a diagram showing a simulation result showing an example of a distribution of intensity of light incident on a plurality of pixels on a sensor substrate 110 in a case in which a nano-photonic lens array 40 according to the comparative example is used. The intensity distribution shown in FIG. 7 denotes an intensity of light incident on each of the pixels in the sensor substrate 110 after passing through the color filter layer 120, in a case in which the light of uniform intensity is incident on the nano-photonic lens array 40. Referring to FIG. 7, the light may be incident with relatively uniform intensity in the first pixel group 111, the third pixel group 113, and the fourth pixel group 114. However, in the second pixel group 112, the intensity of the incident light is not uniform.

Figure 8A:
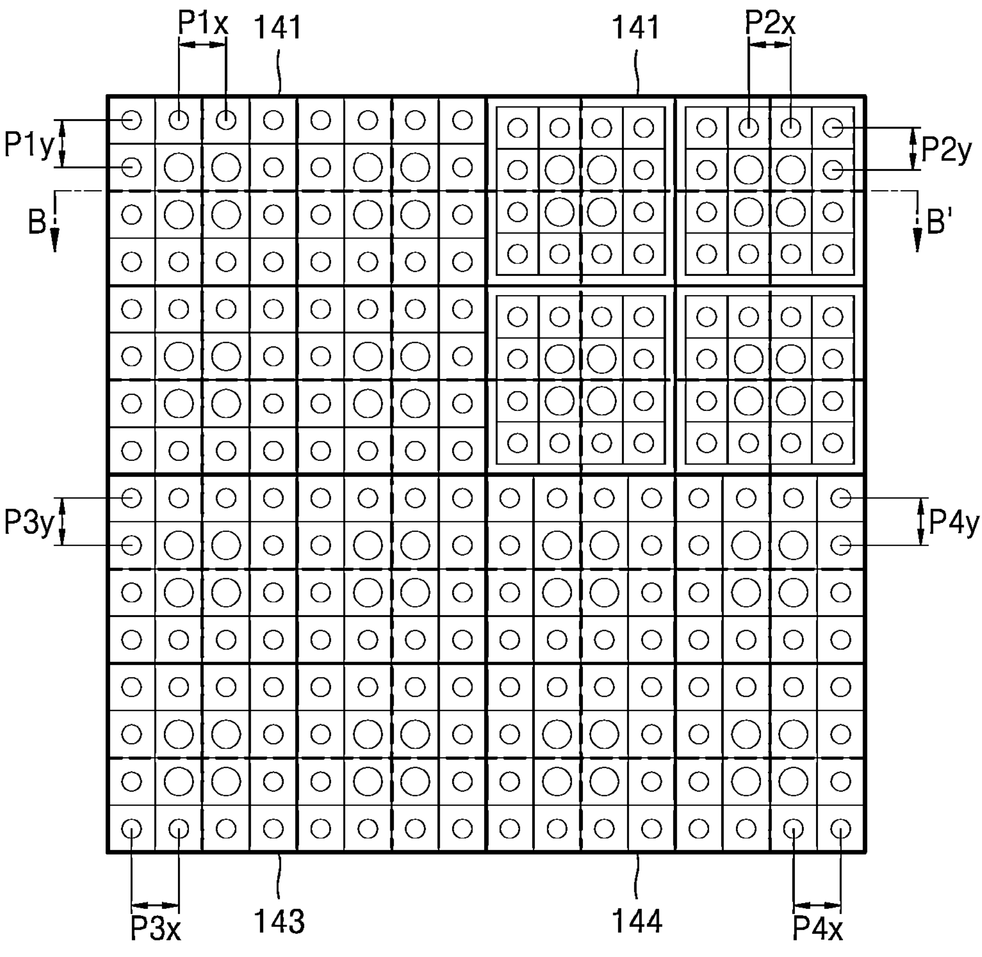
FIG. 8A is a plan view showing a first example structure of one unit pattern in a nano-photonic lens array according to an embodiment.
Figure 8B:
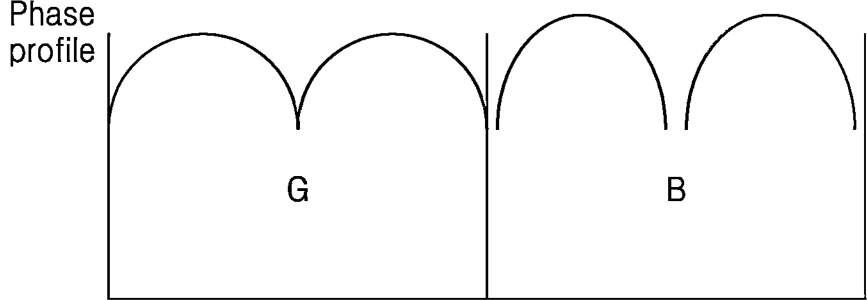
FIG. 8B is a diagram showing an example of a phase profile of transmitting light after passing through a nano-photonic lens array having the first example structure.

FIG. 8A is a plan view showing a structure of one unit pattern in a nano-photonic lens array according to a first example (example 1), and FIG. 8B is a diagram showing a phase profile of transmitting light after passing through a nano-photonic lens array according to the first example. In the first example, in the first region 141, the third region 143, and the fourth region 144, the 1x arrangement period P1x, the 3x arrangement period P3x, and the 4x arrangement period P4x of the nano-structures are equal to one another and the 1y arrangement period Ply, the 3y arrangement period P3y, and the 4y arrangement period P4y are equal to one another, and in the second region 142, the 2x arrangement period P2x of the nano-structures is set to be less than the 1x arrangement period P1x, the 3x arrangement period P3x, and the 4x arrangement period P4x and the 2y arrangement period P2y is set to be less than the 1y arrangement period Ply, the 3y arrangement period P3y, and the 4y arrangement period P4y. In the first example, positions of the lenses in the first to fourth regions 141, 142, 143, and 144 are not adjusted.

FIG. 8B shows a phase profile of the transmitted light on the cross-section of the center of the first and second regions 141 and 142 taken along line B-B' of FIG. 8A. For example, FIG. 8B shows the phase profile of the green light in the light after transmitting through the first region 141 and the phase profile of the blue light in the light after transmitting through the second region 142. Referring to FIG. 8B, because the 2x arrangement period P2x and the 2y arrangement period P2y are reduced more, the phase profile of the blue light after passing through the second region 142 may be more convex than the phase profile of the blue light after passing through the second region 42 in the comparative example. Also, there may be a gap between two adjacent phase profiles of blue light.

Figure 9:
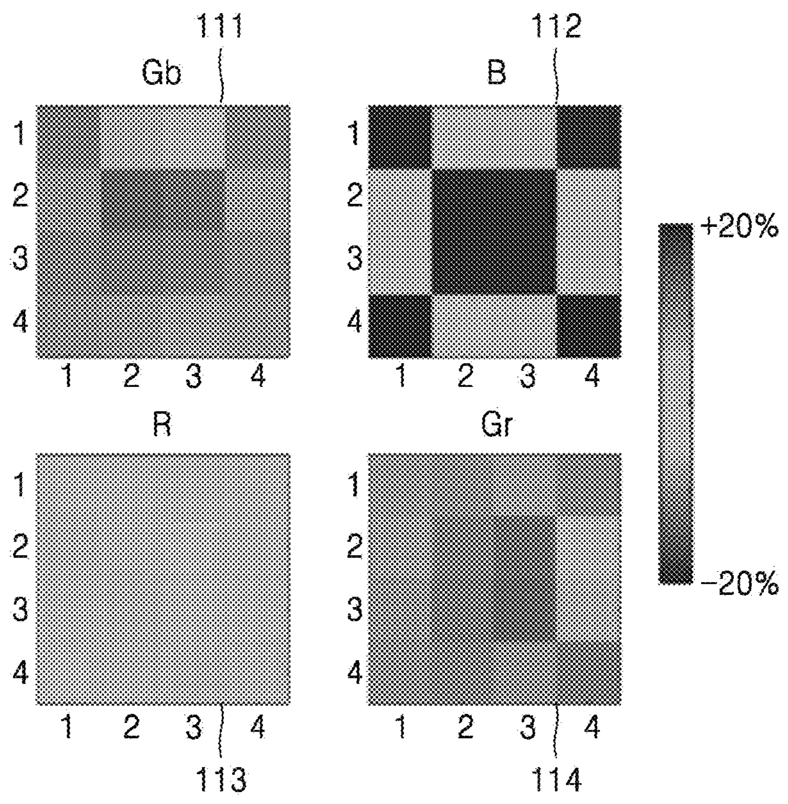
FIG. 9 is a diagram showing a simulation result for an example of a distribution of intensity of light incident on a plurality of pixels on a sensor substrate when a nano-photonic lens array having the first example structure is used.

FIG. 9 is a diagram showing a simulation result showing an example of a distribution of intensity of light incident on a plurality of pixels on a sensor substrate 110 in a case in which a nano-photonic lens array according to first example is used. In an example case in which the phase profile of the blue light is more convex as in the first example, a contrast ratio of an auto-focusing signal with respect to the blue light may be improved. However, as shown in FIG. 9, the uniformity of the light incident on each of the pixels in the first pixel group 111, the second pixel group 112, and the fourth pixel group 114 may degrade.

Figure 10A:
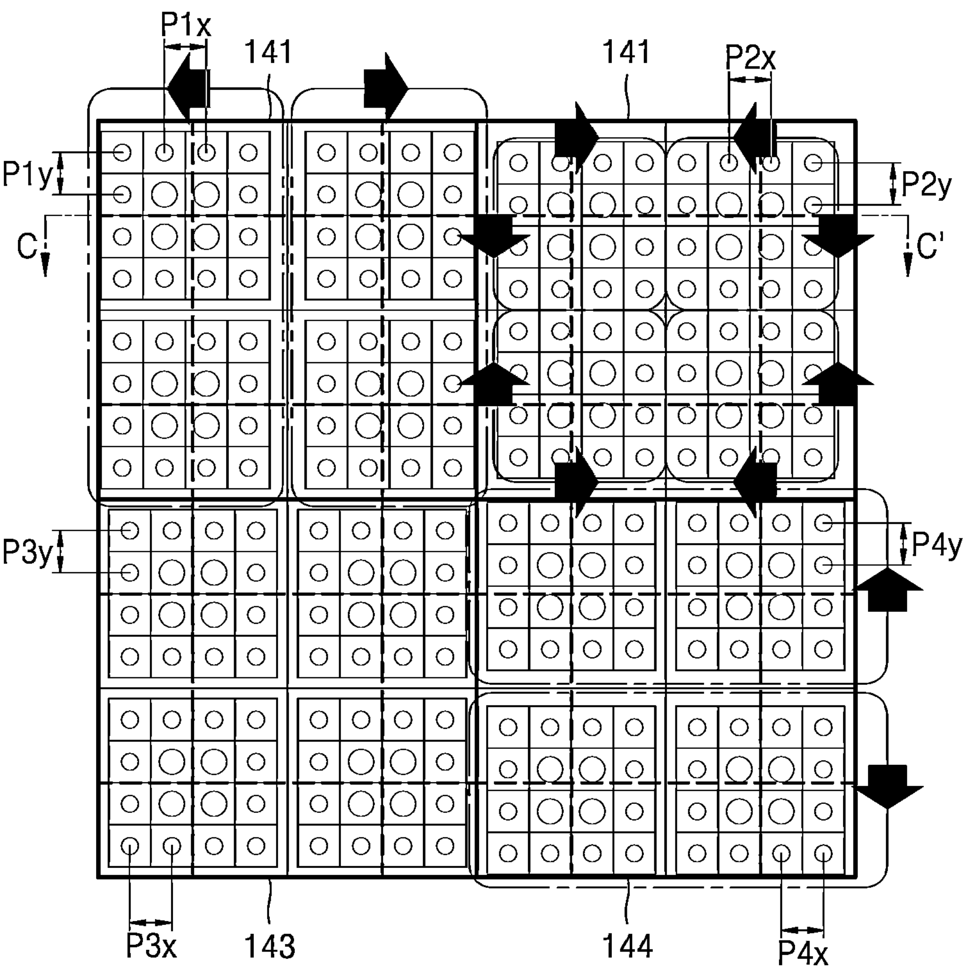
FIG. 10A is a plan view showing a second example structure of a unit pattern in a nano-photonic lens array according to an embodiment.
Figure 10B:
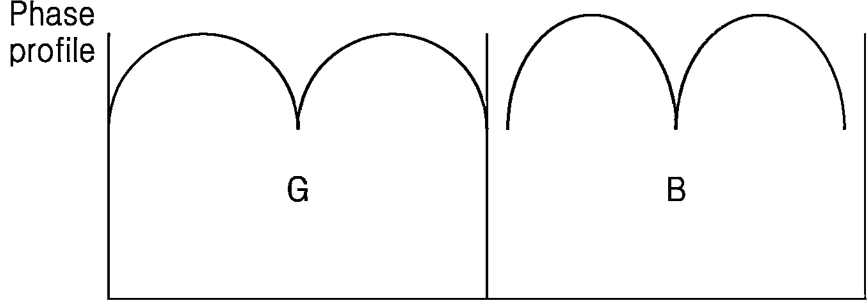
FIG. 10B is a diagram showing an example of a phase profile of transmitting light after passing through a nano-photonic lens array having the second example structure.

FIG. 10A is a plan view showing a structure of one unit pattern in a nano-photonic lens array according to a second example (example 2), and FIG. 10B is a diagram showing an example of a phase profile of transmitting light after passing through a nano-photonic lens array according to the second example. In the second example, the positions of the lenses in the first to fourth regions 141, 142, 143, and 144 of first example are further adjusted as described above with reference to FIG. 5.

FIG. 10B shows a phase profile of the transmitted light on the cross-section of the center of the first and second regions 141 and 142 taken along line C-C' of FIG. 10A. For example, FIG. 10B shows the phase profile of the green light in the light after transmitting through the first region 141 and the phase profile of the blue light in the light after transmitting through the second region 142. Referring to FIG. 10B, the phase profile of the blue light after passing through the second region 142 may be the same as the phase profile of the blue light after passing through the second region 142 in the first example. Also, two adjacent phase profiles of the blue light may be connected without a gap.

Figure 11:
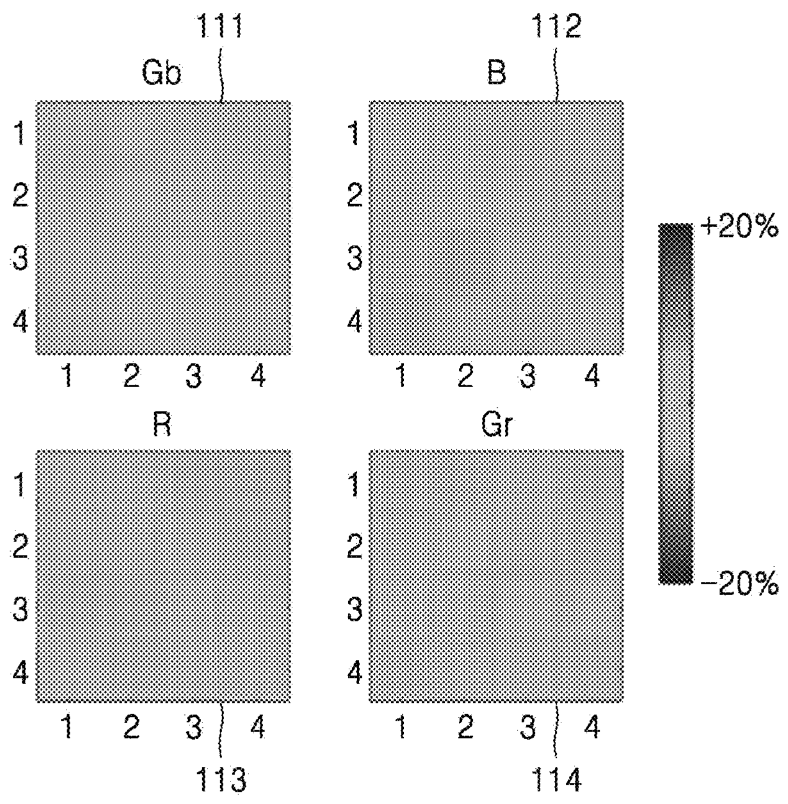
FIG. 11 is a diagram showing a simulation result for an example of a distribution of intensity of light incident on a plurality of pixels on a sensor substrate when a nano-photonic lens array having the second example structure is used.

FIG. 11 is a diagram showing a simulation result showing an example of a distribution of intensity of light incident on a plurality of pixels on a sensor substrate 110 in a case in which a nano-photonic lens array according to a second example is used. Referring to FIG. 11, in an example case in which the nano-photonic lens array according to the second example is used, the light with relatively uniform intensity may be incident on the pixels in the first to fourth pixel groups 111, 112, 113, and 114.

FIG. 12 is a table showing an example of contrast ratios and brightness differences between channels in a comparative example, the first example, and the second example. Referring to FIG. 12, in the comparative example, a contrast ratio of an auto-focusing signal with respect to red light is about 2.41, a contrast ratio of the auto-focusing signal with respect to the green light is about 2.61, and a contrast ratio of the auto-focusing signal with respect to the blue light is about 2.16. Therefore, the contrast ratio of the auto-focusing signal with respect to the blue light is less than those with respect to the red light and the green light. An average contrast ratio of the auto-focusing signal is about 2.39. Also, an average brightness difference among the red channel, the green channel, and the blue channel is about 25.6%.

In the first example (example 1), the contrast ratio of the auto-focusing signal may be increased more than that of the comparative example. For example, a contrast ratio of an auto-focusing signal with respect to red light is about 2.44, a contrast ratio of the auto-focusing signal with respect to the green light is about 2.75, and a contrast ratio of the auto-focusing signal with respect to the blue light is about 2.36. Therefore, the contrast ratio of the auto-focusing signal with respect to the blue light has increased the most. An average contrast ratio of the auto-focusing signal is about 2.51. On the contrary, the difference in brightness among the channels may degrade as compare to the comparative example. For example, an average brightness difference among the red channel, the green channel, and the blue channel is about 47.34%.

In the second example (example 2), the contrast ratio of the auto-focusing signal may be nearly similar to that of the first example. For example, the contrast ratio of the auto-focusing signal with respect to the red light is equal to that of the first example, the contrast ratio of the auto-focusing signal with respect to the green light is about 2.76 that is slightly increased from that of the first example, and the contrast ratio of the auto-focusing signal with respect to the blue light is equal to that of the first example. An average contrast ratio of the auto-focusing signal is about 2.52. Also, the difference in brightness among the channels may be greatly improved as compared with the first example, and may be also improved as compared with the comparative example. For example, an average brightness difference among the red channel, the green channel, and the blue channel is about 11.58%.

Figure 13:
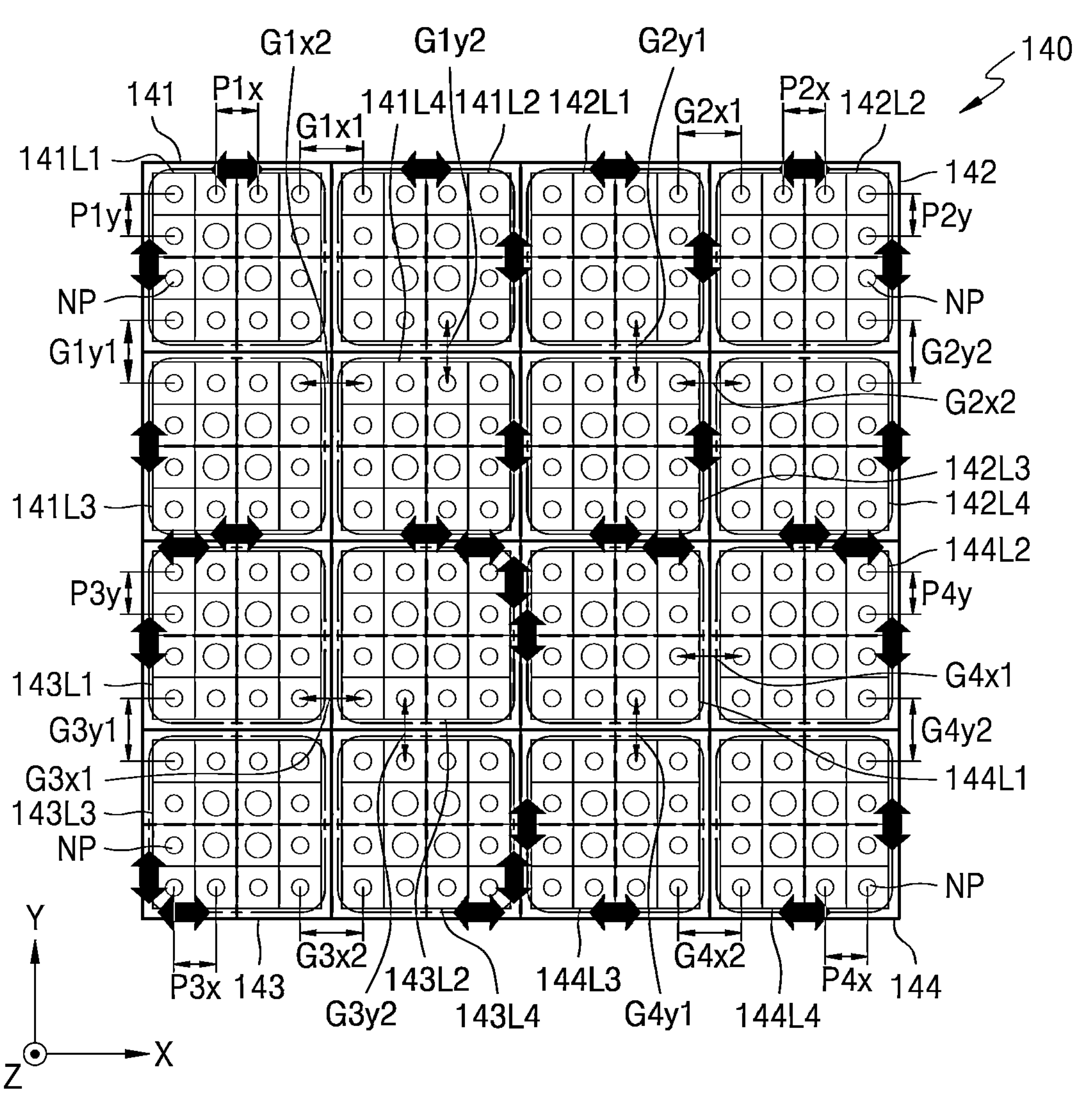
FIG. 13 is a plan view schematically showing an example structure of one unit pattern in a nano-photonic lens array according to another embodiment.

FIG. 13 is a plan view schematically showing an example structure of one unit pattern in a nano-photonic lens array 140 according to another embodiment. After adjusting the 1x arrangement period P1x, the 1y arrangement period P1y, the 2x arrangement period P2x, the 2y arrangement period P2y, the 3x arrangement period P3x, the 3y arrangement period P3y, the 4x arrangement period P4x, and the 4y arrangement period P4y of the nano-structures in the first to fourth regions 141, 142, 143, and 144 and the positions of the lenses in the first, second, and fourth regions 141, 142, and 144 as described above with reference to FIG. 5, the difference between brightness of the channels may be additionally adjusted. For example, the positions of the first lens 141L1, the second lens 141L2, the third lens 141L3, and the fourth lens 141L4 arranged in the first region 141, the positions of the first lens 142L1, the second lens 142L2, the third lens 142L3, and the fourth lens 142L4 arranged in the second region 142, the positions of the first lens 143L1, the second lens 143L2, the third lens 143L3, and the fourth lens 143L4 arranged in the third region 143, or the positions of the first lens 144L1, the second lens 144L2, the third lens 144L3, and the fourth lens 144L4 arranged in the fourth region 144 may be finely adjusted in the first direction or the second direction.

In this case, the gap G1x1 may be different from the gap G1x2 in the first region 141. Also, the gap G1y1 and the gap G1y2 may be different from the 1y arrangement period P1y. Also, the gap G1y1 may be different from the gap G1y2. Therefore, the first lens 141L1, the second lens 141L2, the third lens 141L3, and the fourth lens 141L4 may be aligned such that the first lens 141L1, the second lens 141L2, the third lens 141L3, and the fourth lens 141L4 do not match with one another in the first direction or the second direction. Even in this case, the initial condition determined in FIG. 5 may be satisfied. For example, the gap G1x1 and the gap G1x2 may be greater than the 1x arrangement period P1x.

Likewise, in the second region 142, the gap G2x1 may be different from the gap G2x2, and the gap G2y1 may be different from the gap G2y2. Therefore, the first lens 142L1, the second lens 142L2, the third lens 142L3, and the fourth lens 142L4 may be aligned so as not to match to one another in the first direction or the second direction. Even in this case, the gap G2x1 and the gap G2x2 may be less than the 2x arrangement period P2x, and the gap G2y1 and the gap G2y2 may be less than the 2y arrangement period P2y.

Also, in the third region 143, at least one of the gap G3x1 and the gap G3x2 may not be equal to the 3x arrangement period P3x, and at least one of the gap G3y1 and the gap G3y2 may not be equal to the 3y arrangement period P3y. In this case, at least one of the gap G3x1 and the gap G3x2 may be greater or less than the 3x arrangement period P3x, and at least one of the gap G3y1 and the gap G3y2 may be greater or less than the 3y arrangement period P3y.

Also, in the fourth region 144, the gap G4y1 may be different from the gap G4y2. The gap G4x1 may be different from the gap G4x2, and the gap G4x1 and the gap G4x2 may be different from the 4x arrangement period P4x. Therefore, the first lens 144L1, the second lens 144L2, the third lens 144L3, and the fourth lens 144L4 may be aligned so as not to match to one another in the first direction or the second direction. Even in this case, the initial condition determined in FIG. 5 may be satisfied. For example, the gap G4x1 and the gap G4x2 may be greater than the 4y arrangement period P4y.

Figure 14A:
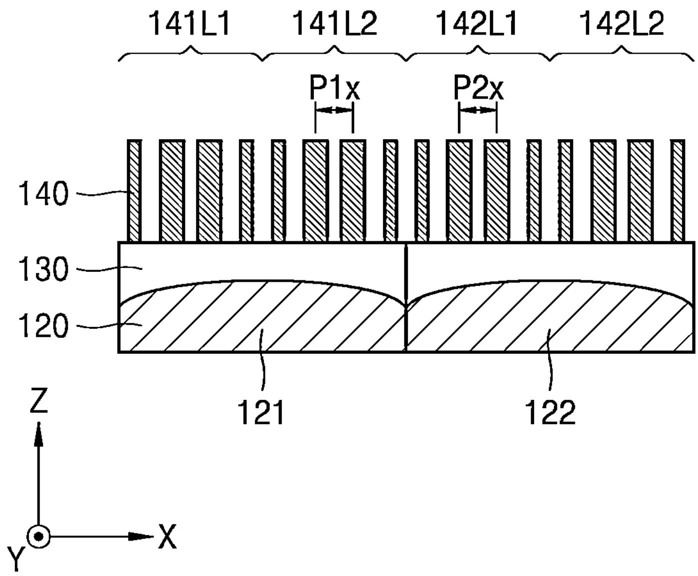
FIG. 14A is a diagram showing a cross-sectional shape of a nano-structure at a center portion of a nano-photonic lens array and FIG. 14B is a diagram showing a phase profile of transmitting light at a center portion of a nano-photonic lens array.
Figure 14B:
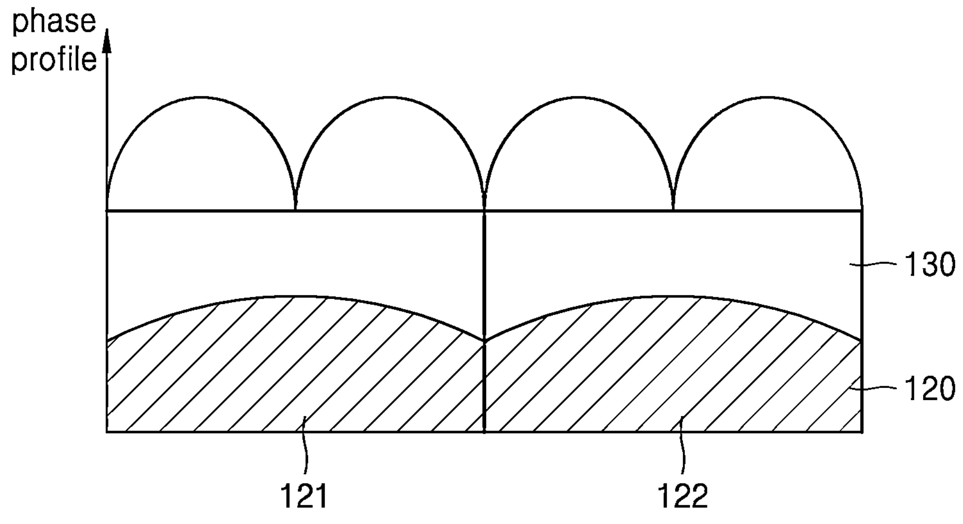

FIG. 14A is a diagram showing a cross-sectional shape of a nano-structure at a center portion of a nano-photonic lens array 140 and FIG. 14B is a diagram showing a phase profile of transmitting light at a center portion of the nano-photonic lens array 140. Referring to FIG. 14A, at the center portion of the nano-photonic lens array 140, each of the lenses may have a symmetrical effective refractive index distribution based on the center of each lens. Here, the effective refractive index may correspond to a ratio between the refractive index of the nano-structure and the refractive index of a peripheral material surrounding the nano-structure in each lens. The effective refractive index may be determined by widths or diameters of the nano-structures in the lens. Therefore, in each lens arranged on the center portion of the nano-photonic lens array 140, the nano-structures may have symmetrical distribution of widths or diameters based on the center of each lens. For example, the widths or diameters of the nano-structures may be determined so that the effective refractive index is the highest at the center of each lens and is reduced away from the center of the lens.

Referring to FIG. 14B, the phase profile of the transmitted light after passing through each lens on the center portion of the nano-photonic lens array 140 may have a symmetrical convex lens shape. For example, at the center of each lens, the phase of the transmitted light may be the highest and may be reduced in a concentric circle form toward the peripheral portion.

Figure 15A:
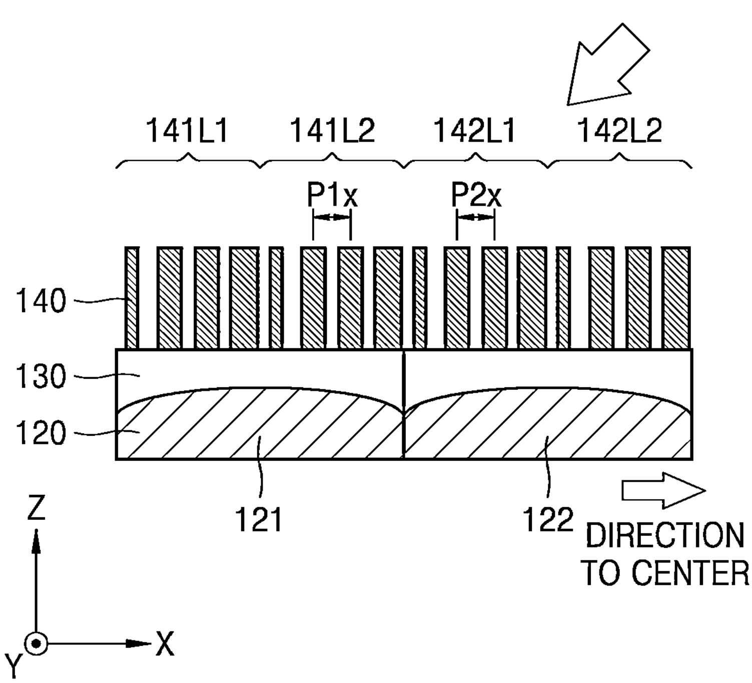
FIG. 15A is a diagram showing a cross-sectional shape of a nano-structure at a peripheral portion of a nano-photonic lens array.
Figure 15B:
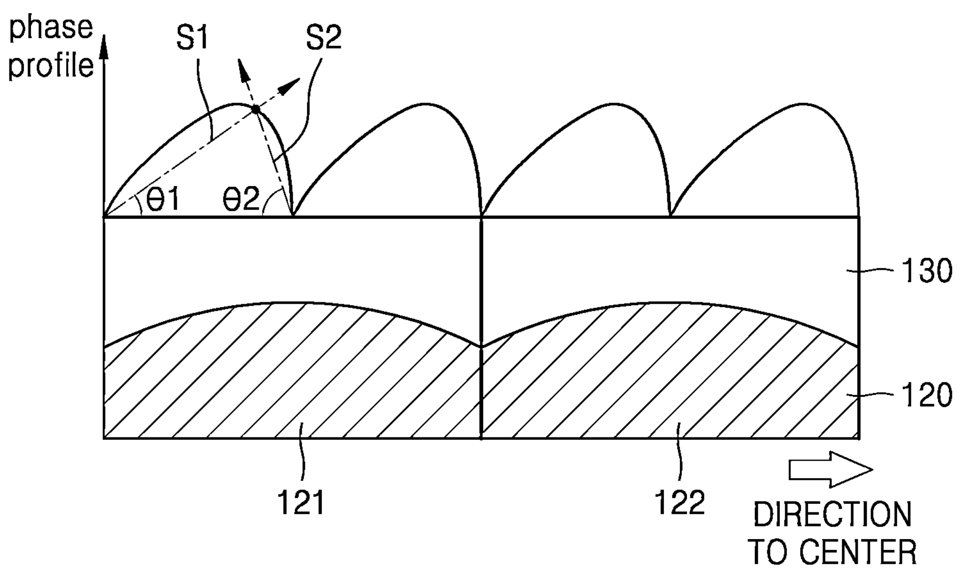
FIG. 15B is a diagram showing a phase profile of transmitting light at a peripheral portion of a nano-photonic lens array.

FIG. 15A is a diagram showing examples of a cross-sectional shape of the nano-structure on the periphery portion of the nano-photonic lens array 140 and FIG. 15B is a diagram showing a phase profile of the transmitted light on the periphery portion of the nano-photonic lens array 140. Referring to FIG. 15A, the incident light may be incident on the nano-photonic lens array 140 to be inclined in the periphery portion of the nano-photonic lens array 140. Accordingly, the lenses arranged on the periphery portion of the nano-photonic lens array 140 may be configured to change the proceeding direction of the light that is incident in an inclined angle nearly to the vertical direction. Therefore, a distribution of the widths and diameters of the nano-structures in the lenses arranged on the periphery portion of the nano-photonic lens array 140 may be different from that of the nano-structures in the lenses arranged on the center portion of the nano-photonic lens array 140. For example, the nano-structures in the lenses arranged on the periphery portion of the nano-photonic lens array 140 may be arranged in an asymmetrical distribution. In other words, the widths or diameters of the nano-structures in each lens may be asymmetrically distributed in consideration of a chief ray angle (CRA). In particular, a region having the highest effective refractive index in each lens may be shifted toward the center portion of the nano-photonic lens array 140.

Referring to FIG. 15B, a peak in the phase of the transmitted light after passing through each lens arranged on the periphery portion of the nano-photonic lens array 140 may be out of the center of each lens toward the center portion of the nano-photonic lens array 140. Also, the phase profile of the transmitted light may have an asymmetrical shape based on the phase peak. In other words, the phase profiles on both sides based on the phase peak may be different from each other. For example, based on the phase peak, an inclination or variation amount of the phase profile on the region adjacent to the center portion of the nano-photonic lens array 140 may be greater than that of the phase profile on the region away from the center portion of the nano-photonic lens array 140. For example, an inclination or an inclination angle θ1 of a first line segment S1 that connects a phase and a phase peak of transmitted light at a first edge of each lens may be less than an inclination or an inclination angle θ2 of a second line segment S2 that connects a phase and a phase peak of transmitted light at a second edge.

As described above, even in an example case in which the widths or diameters of the nano-structures are designed asymmetrically in consideration of the CRA of the incident light on the periphery portion of the nano-photonic lens array 140, the arrangement period of the nano-structures in the lenses and the positions of the lenses described above with reference to FIGS. 5 to 13 may be identically applied. In other words, in the entire area of the nano-photonic lens array 140, the 1x arrangement period P1x, the 1y arrangement period Ply, the 2x arrangement period P2x, the 2y arrangement period P2y, the 3x arrangement period P3x, the 3y arrangement period P3y, the 4x arrangement period P4x, and the 4y arrangement period P4y of the nano-structures in the first to fourth regions 141, 142, 143, and 144 may be constantly maintained. Also, in the entire area of the nano-photonic lens array 140, the gaps G1x1, G1x2, G1y1, G1y2, G2x1, G2x2, G2y1, G2y2, G3x1, G3x2, G3y1, G3y2, G4x1, G4x2, G4y1, and G4y2 may be constantly maintained.

Figure 16A:
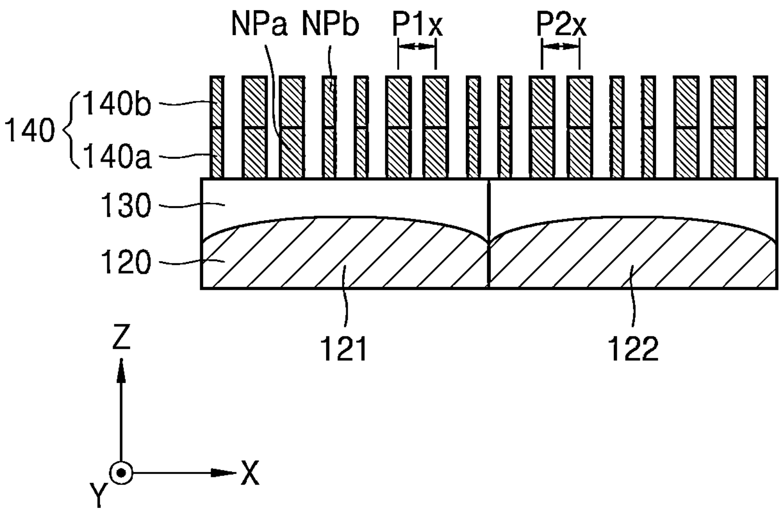
FIG. 16A is a cross-sectional view schematically showing an example structure of a center portion of a nano-photonic lens array, according to another embodiment.

FIG. 16A is a cross-sectional view schematically showing an example structure of a center portion of a nano-photonic lens array 140, according to another embodiment. Referring to FIG. 16A, the nano-photonic lens array 140 may have a two or more multi-layered structures. For example, the nano-photonic lens array 140 may include a first nano-photonic lens array 140*a* arranged on a planarization layer 130, and a second nano-photonic lens array 140*b* arranged on the first nano-photonic lens array 140*a*. The first nano-photonic lens array 140*a* may include a plurality of first nano-structures NPa, and the second nano-photonic lens array 140*b* may include a plurality of second nano-structures NPb on the plurality of first nano-structures NPa. On the center portion of the nano-photonic lens array 140, widths or diameters of the plurality of first nano-structures NPa and widths or diameters of the plurality of second nano-structures NPb may be symmetrical based on the center of each lens. For example, a width or diameter of each of the second nano-structures NPb may be equal to that of the corresponding first nano-structure NPa arranged thereunder.

The arrangement period or the nano-structures in the lenses and the positions of the lenses described above with reference to FIG. 5 or FIG. 13 may be applied in a same or similar manner to the first nano-photonic lens array 140*a* and the second nano-photonic lens array 140*b*. For example, the above descriptions about the 1x arrangement period P1x, the 1y arrangement period Ply, the 2x arrangement period P2x, the 2y arrangement period P2y, the 3x arrangement period P3x, the 3y arrangement period P3y, the 4x arrangement period P4x, and the 4y arrangement period P4y of the nano-structures in the first to fourth regions 141, 142, 143, and 144 may be identically applied in the first nano-photonic lens array 140*a* and the second nano-photonic lens array 140*b*. Also, the above descriptions about the gaps G1x1, G1x2, G1y1, G1y2, G2×1, G2×2, G2y1, G2y2, G3x1, G3x2, G3y1, G3y2, G4x1, G4x2, G4y1, and G4y2 may be identically applied to the first nano-photonic lens array 140*a* and the second nano-photonic lens array 140*b*.

Figure 16B:
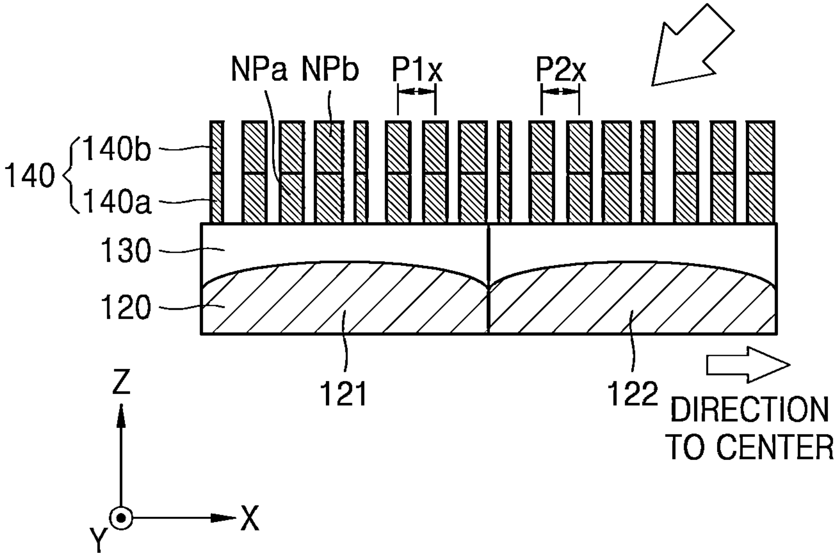
FIG. 16B is a cross-sectional view schematically showing an example structure of a peripheral portion of a nano-photonic lens array, according to another embodiment.

FIG. 16B is a cross-sectional view schematically showing an example structure of a periphery portion of a nano-photonic lens array 140, according to another embodiment. Referring to FIG. 16B, the widths or diameters of the plurality of first nano-structures NPa and the widths or diameters of the plurality of second nano-structures NPb may be asymmetrically designed in consideration of the CRA of the incident light on the periphery portion of the nano-photonic lens array 140.

Figure 16C:
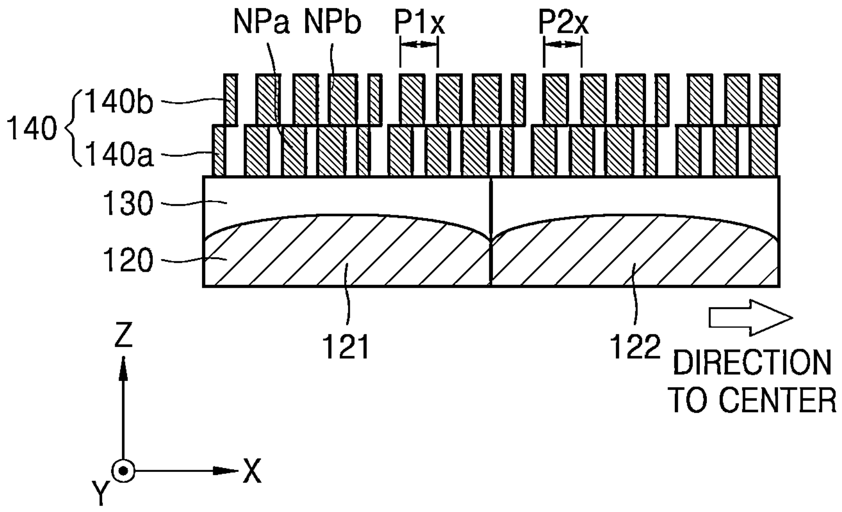
FIG. 16C is a cross-sectional view schematically showing an example structure of a peripheral portion of a nano-photonic lens array, according to another embodiment.

FIG. 16C is a cross-sectional view schematically showing an example structure of a periphery portion of a nano-photonic lens array 140, according to another embodiment. Referring to FIG. 16C, each of the second nano-structures NPb may be shifted toward the center portion of the nano-photonic lens array 140 with respect to the corresponding first nano-structure NPa arranged thereunder.

According to an embodiment, even in an example case in which the CRA of the incident light on the periphery portion of the nano-photonic lens array 140 is considered as shown in FIGS. 16B and 16C, the arrangement period of the nano-structures in the lenses and the positions of the lenses described above with reference to FIG. 5 or FIG. 13 may be identically applied to the first nano-photonic lens array 140*a* and the second nano-photonic lens array 140*b*. Therefore, in the entire area of the nano-photonic lens array 140, the above descriptions about the 1x arrangement period P1x, the 1y arrangement period Ply, the 2x arrangement period P2x, the 2y arrangement period P2y, the 3x arrangement period P3x, the 3y arrangement period P3y, the 4x arrangement period P4x, and the 4y arrangement period P4y of the nano-structures in the first to fourth regions 141, 142, 143, and 144 may be identically applied to the first nano-photonic lens array 140*a* and the second nano-photonic lens array 140*b*. Also, in the entire area of the nano-photonic lens array 140, the above descriptions about the gaps G1x1, G1x2, G1y1, G1y2, G2x1, G2x2, G2y1, G2y2, G3x1, G3x2, G3y1, G3y2, G4x1, G4x2, G4y1, and G4y2 may be identically applied to the first nano-photonic lens array 1400*a* and the second nano-photonic lens array 140*b*.

Figure 17:
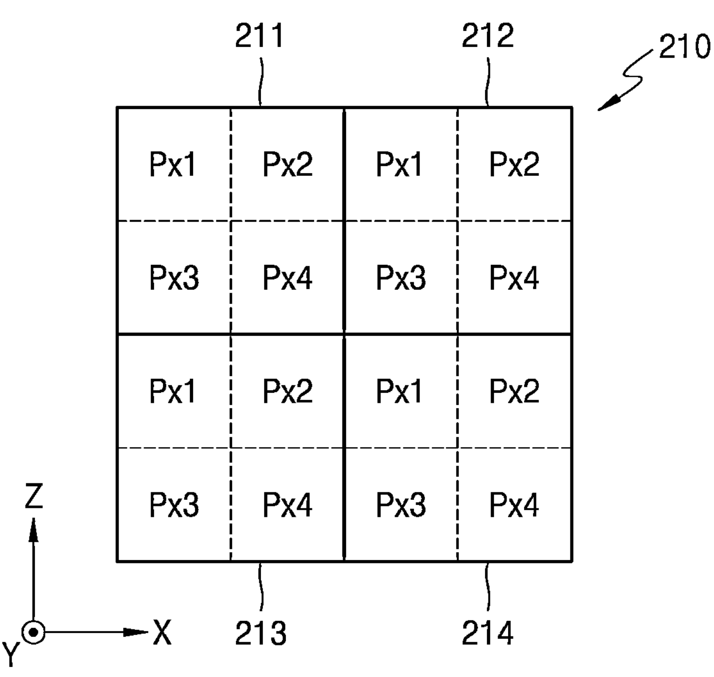
FIG. 17 is a plan view schematically showing an example structure of a unit pixel array in a sensor substrate according to another embodiment.

FIG. 17 is a plan view schematically showing an example structure of one unit pixel array in a sensor substrate according to another embodiment. Referring to FIG. 17, a sensor substrate 210 may include a first pixel group 211, a second pixel group 212, a third pixel group 213, and a fourth pixel group 214 arranged in a 2x2 array. Also, each of the first pixel group 211, the second pixel group 212, the third pixel group 213, and the fourth pixel group 214 may include a plurality of independent pixels that are grouped and arranged in a 2×2 array, e.g., first to fourth pixels Px1, Px2, Px3, and Px4. Therefore, each of the first pixel group 211, the second pixel group 212, the third pixel group 213, and the fourth pixel group 214 may include four pixels. The first to fourth pixel groups 211, 212, 213, and 214 of the sensor substrate 210 shown in FIG. 17 do not include a separate sub-group, e.g., the first to fourth sub-groups 111, 112, 113, and 114 of the sensor substrate 110 shown in FIG. 3. Although FIG. 17 only shows one unit pixel array, a plurality of first pixel groups 211 and a plurality of second pixel groups 212 may be alternately arranged in the first direction, and a plurality of third pixel groups 213 and a plurality of fourth pixel groups 214 may be alternately arranged in the first direction in a cross-section at different location in the second direction perpendicular to the first direction.

Figure 18:
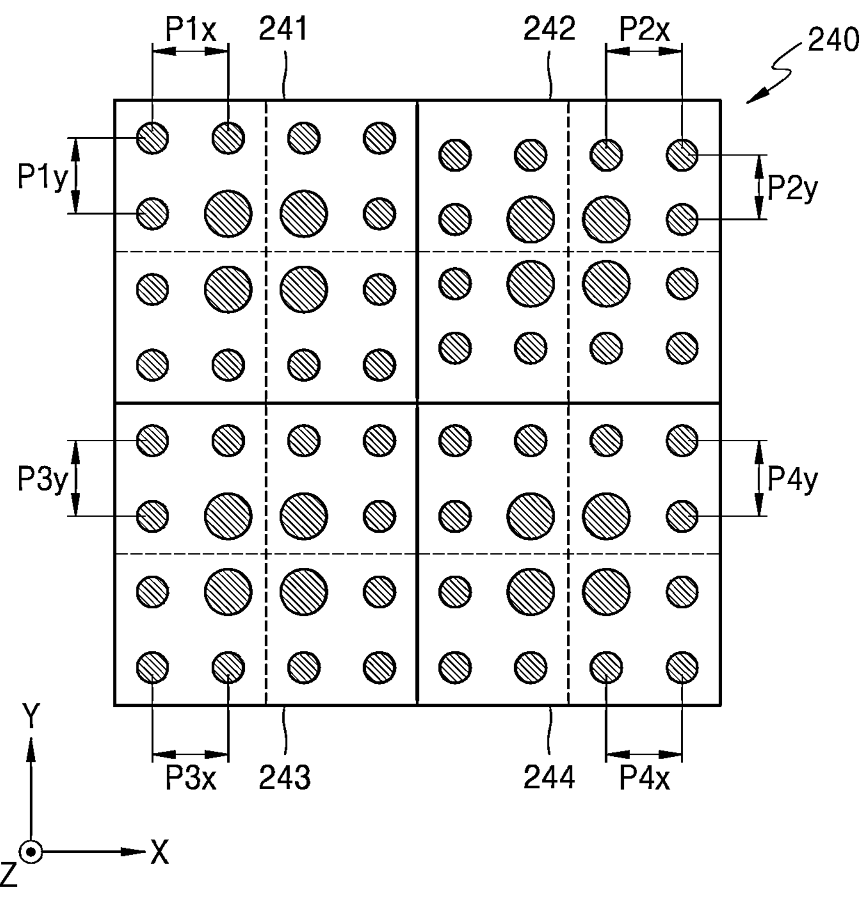
FIG. 18 is a plan view schematically showing an example structure of a unit pattern in a nano-photonic lens array according to another embodiment.

FIG. 18 is a plan view schematically showing an example structure of one unit pattern in a nano-photonic lens array according to another embodiment. Referring to FIG. 18, a nano-photonic lens array 240 may include a first region 241, a second region 242, a third region 243, and a fourth region 244 arranged in a 2×2 array. The first region 241 may be arranged to face the first pixel group 211, the second region 242 may be arranged to face the second pixel group 212, the third region 243 may be arranged to face the third pixel group 213, and the fourth region 244 may be arranged to face the fourth pixel group 214 in the third direction. Therefore, the first region 241 may face all four pixels in the first pixel group 211, the second region 242 may face all four pixels in the second pixel group 212, the third region 243 may face all four pixels in the third pixel group 213, and the fourth region 244 may face all four pixels in the fourth pixel group 214 in the third direction.

The first region 241, the second region 242, the third region 243, and the fourth region 244 may each include only one lens facing all of the four pixels in each of the first pixel group 211, the second pixel group 212, the third pixel group 213, and the fourth pixel group 214 corresponding thereto. In other words, each of the first region 241, the second region 242, the third region 243, and the fourth region 244 may act as one lens.

Also, each of the first region 241, the second region 242, the third region 243, and the fourth region 244 may include a plurality of nano-structures that are arranged periodically in a two-dimensional array so as to condense incident light. In the first region 241, the plurality of nano-structures may be periodically arranged with the 1x arrangement period P1x in the first direction and the 1y arrangement period P1y in the second direction, in the second region 242, the plurality of nano-structures may be periodically arranged with the 2x arrangement period P2x in the first direction and the 2y arrangement period P2y in the second direction, in the third region 243, the plurality of nano-structures may be arranged periodically with the 3x arrangement period P3x in the first direction and the 3y arrangement period P3y in the second direction, and in the fourth region 244, the plurality of nano-structures may be periodically arranged with the 4x arrangement period P4x in the first direction and the 4y arrangement period P4y in the second direction. According to an embodiment, the 1x arrangement period P1x, the 3x arrangement period P3x, and the 4x arrangement period P4x are equal to one another, and the 2x arrangement period P2x may be less than the 1x arrangement period P1x, the 3x arrangement period P3x, and the 4x arrangement period P4x. Also, the 1y arrangement period P1y, the 3y arrangement period P3y, and the 4y arrangement period P4y may be equal to one another, and the 2y arrangement period P2y may be less than the 1y arrangement period Ply, the 3y arrangement period P3y, and the 4y arrangement period P4y. According to the arrangement type of the plurality of nano-structures NP, the 1x arrangement period P1x and the 1y arrangement period P1y may be equal to or different from one another, the 2x arrangement period P2x and the 2y arrangement period P2y may be equal to or different from one another, the 3x arrangement period P3x and the 3y arrangement period P3y may be equal to or different from one another, and the 4x arrangement period P4x and the 4y arrangement period P4y may be equal to or different from one another.

The sensor substrate 110 and the nano-photonic lens array 140 shown in FIGS. 2A and 2B may be replaced with the sensor substrate 210 shown in FIG. 17 and the nano-photonic lens array 240 shown in FIG. 18, respectively. In this case, the first color filter 121 may face the first pixel group 211 and the first region 241, the second color filter 122 may face the second pixel group 212 and the second region 242, the third color filter 123 may face the third pixel group 213 and the third region 243, and the fourth color filter 124 may face the fourth pixel group 214 and the fourth region 244 in the third direction.

An image sensor 1000 according to an embodiment may have the improved light utilization efficiency and reduced degradation in the resolution. Also, the image sensor 1000 according to the embodiment may provide more improved auto-focusing signal and may maintain a relatively uniform sensitivity in a plurality of pixels. The image sensor 1000 according to the embodiment may form a camera module along with a module lens of various functions and may be utilized in various electronic devices.

Figure 19:
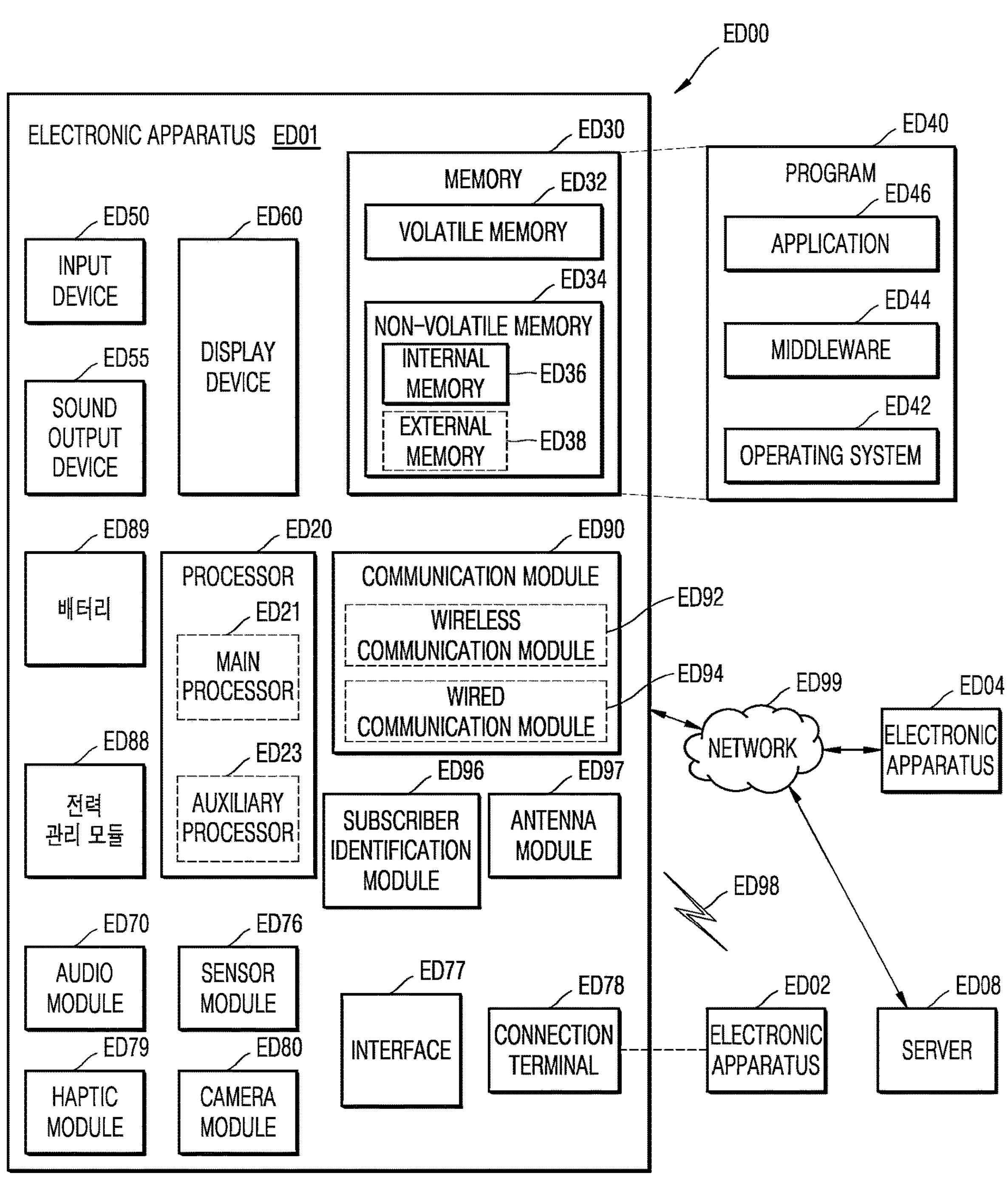
FIG. 19 is a block diagram of an electronic device including an image sensor according to an embodiment.

FIG. 19 is a block diagram showing an example of an electronic apparatus ED01 including the image sensor 1000. Referring to FIG. 19, in a network environment ED00, the electronic apparatus ED01 may communicate with another electronic apparatus ED02 via a first network ED98 (short-range wireless communication network, etc.), or may communicate with another electronic apparatus ED04 and/or a server ED08 via a second network ED99 (long-range wireless communication network, etc.). The electronic apparatus ED01 may communicate with the electronic apparatus ED04 via the server ED08. The electronic apparatus ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic apparatus ED01, some (display device ED60, etc.) of the elements may be omitted or another element may be added. Some of the elements may be configured as one integrated circuit. For example, the sensor module ED76 (a fingerprint sensor, an iris sensor, an illuminance sensor, etc.) may be embedded and implemented in the display device ED60 (display, etc.).

The processor ED20 may control one or more elements (hardware, software elements, etc.) of the electronic apparatus ED01 connected to the processor ED20 by executing software (program ED40, etc.), and may perform various data processes or operations. As a part of the data processing or operations, the processor ED20 may load a command and/or data received from another element (sensor module ED76, communication module ED90, etc.) to a volatile memory ED32, may process the command and/or data stored in the volatile memory ED32, and may store result data in a non-volatile memory ED34. The processor ED20 may include a main processor ED21 (central processing unit, application processor, etc.) and an auxiliary processor ED23 (graphic processing unit, image signal processor, sensor hub processor, communication processor, etc.) that may be operated independently from or along with the main processor ED21. The auxiliary processor ED23 may use less power than that of the main processor ED21, and may perform specified functions.

The auxiliary processor ED23, on behalf of the main processor ED21 while the main processor ED21 is in an inactive state (sleep state) or along with the main processor ED21 while the main processor ED21 is in an active state (application executed state), may control functions and/or states related to some (display device ED60, sensor module ED76, communication module ED90, etc.) of the elements in the electronic apparatus ED01. The auxiliary processor ED23 (image signal processor, communication processor, etc.) may be implemented as a part of another element (camera module ED80, communication module ED90, etc.) that is functionally related thereto.

The memory ED30 may store various data required by the elements (processor ED20, sensor module ED76, etc.) of the electronic apparatus ED01. The data may include, for example, input data and/or output data about software (program ED40, etc.) and commands related thereto. The memory ED30 may include the volatile memory ED32 and/or the non-volatile memory ED34. The non-volatile memory ED34 may include an internal memory ED36 and an external memory ED38.

The program ED40 may be stored as software in the memory ED30, and may include an operation system ED42, middleware ED44, and/or an application ED46.

The input device ED50 may receive commands and/or data to be used in the elements (processor ED20, etc.) of the electronic apparatus ED01, from outside (user, etc.) of the electronic apparatus ED01. The input device ED50 may include a microphone, a mouse, a keyboard, and/or a digital pen (stylus pen).

The sound output device ED55 may output a sound signal to outside of the electronic apparatus ED01. The sound output device ED55 may include a speaker and/or a receiver. The speaker may be used for a general purpose such as multimedia reproduction or record play, and the receiver may be used to receive a call. The receiver may be coupled as a part of the speaker or may be implemented as an independent device.

The display device ED60 may provide visual information to outside of the electronic apparatus ED01. The display device ED60 may include a display, a hologram device, or a projector, and a control circuit for controlling the corresponding device. The display device ED60 may include a touch circuitry set to sense a touch, and/or a sensor circuit (pressure sensor, etc.) that is set to measure a strength of a force generated by the touch.

The audio module ED70 may convert sound into an electrical signal or vice versa. The audio module ED 70 may acquire sound through the input device ED50, or may output sound via the sound output device ED55 and/or a speaker and/or a headphone of another electronic apparatus (electronic apparatus ED02, etc.) connected directly or wirelessly to the electronic apparatus ED01.

The sensor module ED76 may sense an operating state (power, temperature, etc.) of the electronic apparatus ED01, or an outer environmental state (user state, etc.), and may generate an electrical signal and/or data value corresponding to the sensed state. The sensor module ED76 may include a gesture sensor, a gyro-sensor, a pressure sensor, a magnetic sensor, an acceleration sensor, a grip sensor, a proximity sensor, a color sensor, an infrared (IR) ray sensor, a vivo sensor, a temperature sensor, a humidity sensor, and/or an illuminance sensor.

The interface ED77 may support one or more designated protocols that may be used in order for the electronic apparatus ED01 to be directly or wirelessly connected to another electronic apparatus (electronic apparatus ED02, etc.) The interface ED77 may include a high-definition multimedia interface (HDMI), a universal serial bus (USB) interface, an SD card interface, and/or an audio interface.

The connection terminal ED78 may include a connector by which the electronic apparatus ED01 may be physically connected to another electronic apparatus (electronic apparatus ED02, etc.). The connection terminal ED78 may include an HDMI connector, a USB connector, an SD card connector, and/or an audio connector (headphone connector, etc.).

The haptic module ED79 may convert the electrical signal into a mechanical stimulation (vibration, motion, etc.) or an electric stimulation that the user may sense through a tactile or motion sensation. The haptic module ED79 may include a motor, a piezoelectric device, and/or an electric stimulus device.

The camera module ED80 may capture a still image and a video. The camera module ED80 may include a lens assembly including one or more lenses, the image sensor 1000 of FIG. 1, image signal processors, and/or flashes. The lens assembly included in the camera module ED80 may collect light emitted from an object that is an object to be captured.

The power management module ED88 may manage the power supplied to the electronic apparatus ED01. The power management module ED88 may be implemented as a part of a power management integrated circuit (PMIC).

The battery ED89 may supply electric power to components of the electronic apparatus ED01. The battery ED89 may include a primary battery that is not rechargeable, a secondary battery that is rechargeable, and/or a fuel cell.

The communication module ED90 may support the establishment of a direct (wired) communication channel and/or a wireless communication channel between the electronic apparatus ED01 and another electronic apparatus (electronic apparatus ED02, electronic apparatus ED04, server ED08, etc.), and execution of communication through the established communication channel. The communication module ED90 may be operated independently from the processor ED20 (application processor, etc.), and may include one or more communication processors that support the direct communication and/or the wireless communication. The communication module ED90 may include a wireless communication module ED92 (cellular communication module, a short-range wireless communication module, a global navigation satellite system (GNSS) communication module) and/or a wired communication module ED94 (local area network (LAN) communication module, a power line communication module, etc.). From among the communication modules, a corresponding communication module may communicate with another electronic apparatus via a first network ED09 (short-range communication network such as Bluetooth, WiFi direct, or infrared data association (IrDA)) or a second network ED99 (long-range communication network such as a cellular network, Internet, or computer network (LAN, WAN, etc.)). Such above various kinds of communication modules may be integrated as one element (single chip, etc.) or may be implemented as a plurality of elements (a plurality of chips) separately from one another. The wireless communication module ED92 may identify and authenticate the electronic apparatus ED01 in a communication network such as the first network ED98 and/or the second network ED99 by using subscriber information (international mobile subscriber identifier (IMSI), etc.) stored in the subscriber identification module ED96.

The antenna module ED97 may transmit or receive the signal and/or power to/from outside (another electronic apparatus, etc.). An antenna may include a radiator formed as a conductive pattern formed on a substrate (PCB, etc.). The antenna module ED97 may include one or more antennas. In an example case in which the antenna module ED97 includes a plurality of antennas, from among the plurality of antennas, an antenna that is suitable for the communication type used in the communication network such as the first network ED98 and/or the second network ED99 may be selected by the communication module ED90. The signal and/or the power may be transmitted between the communication module ED90 and another electronic apparatus via the selected antenna. Another component (RFIC, etc.) other than the antenna may be included as a part of the antenna module ED97.

Some of the elements may be connected to one another via the communication method among the peripheral devices (bus, general purpose input and output (GPIO), serial peripheral interface (SPI), mobile industry processor interface (MIPI), etc.) and may exchange signals (commands, data, etc.).

The command or data may be transmitted or received between the electronic apparatus ED01 and the external electronic apparatus ED04 via the server ED08 connected to the second network ED99. Other electronic apparatuses ED02 and ED04 may be the devices that are the same as or different kinds from the electronic apparatus ED01. All or some of the operations executed in the electronic apparatus ED01 may be executed in one or more devices among the other electronic apparatuses ED02, ED04, and ED08. In an example case in which the electronic apparatus ED01 has to perform a certain function or service, the electronic apparatus ED01 may request one or more other electronic apparatuses to perform some or entire function or service, instead of executing the function or service by itself. One or more electronic apparatuses receiving the request execute an additional function or service related to the request and may transfer a result of the execution to the electronic apparatus ED01. To do this, for example, a cloud computing, a distributed computing, or a client-server computing technique may be used.

Figure 20:
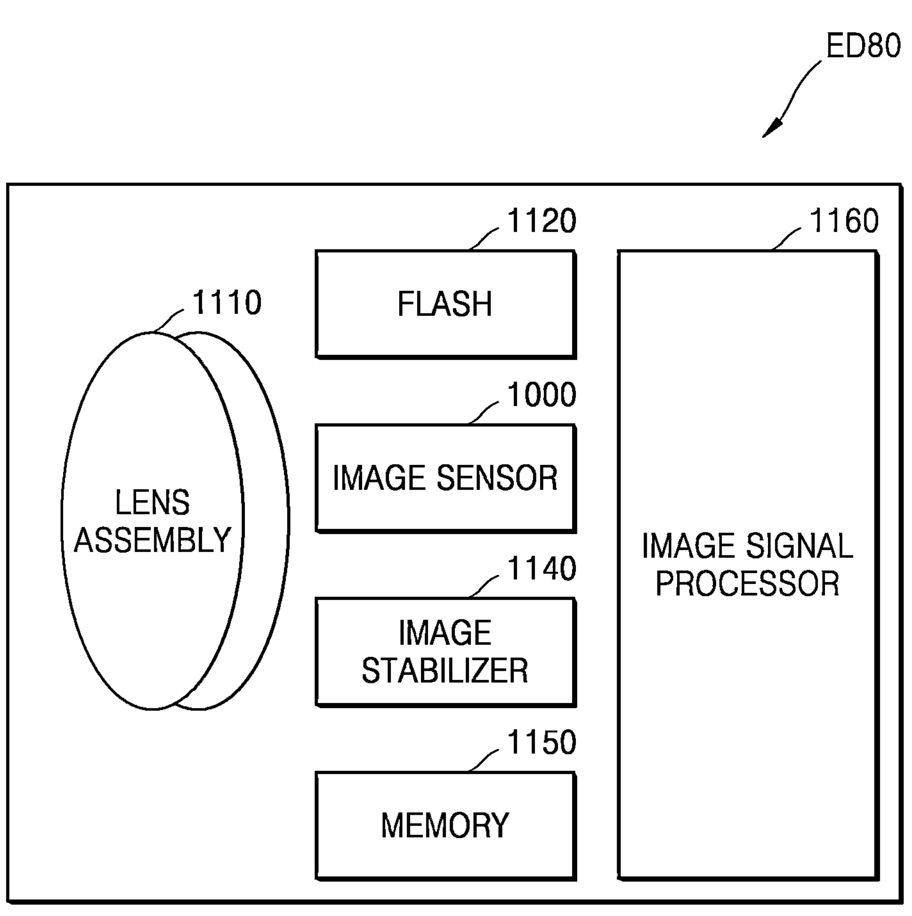
FIG. 20 is a block diagram of a camera module in FIG. 19.

FIG. 20 is a block diagram showing an example of the camera module ED80 included in the electronic apparatus ED01 of FIG. 19. Referring to FIG. 20, the camera module ED80 may include a lens assembly 1110, a flash 1120, an image sensor 1000, an image stabilizer 1140, a memory 1150 (buffer memory, etc.), and/or an image signal processor 1160. The lens assembly 1110 may collect light emitted from an object that is to be captured. The camera module ED80 may include a plurality of lens assemblies 1110, and in this case, the camera module ED80 may include a dual camera module, a 360-degree camera, or a spherical camera. Some of the plurality of lens assemblies 1110 may have the same lens properties (viewing angle, focal length, auto-focus, F number, optical zoom, etc.) or different lens properties. The lens assembly 1110 may include a wide-angle lens or a telephoto lens.

The flash 1120 may emit light that is used to strengthen the light emitted or reflected from the object. The flash 1120 may emit visible light or infrared-ray light. The flash 1120 may include one or more light-emitting diodes (red-green-blue (RGB)) LED, white LED, infrared LED, ultraviolet LED, etc.), and/or a Xenon lamp. The image sensor 1000 may be the image sensor described above with reference to FIG. 1, and converts the light emitted or reflected from the object and transferred through the lens assembly 1110 into an electrical signal to obtain an image corresponding to the object.

The image stabilizer 1140, based on a motion of the camera module ED80 or the electronic apparatus 1101 including the camera module ED80, moves one or more lenses included in the lens assembly 1110 or the image sensor 1000 in a certain direction or controls the operating characteristics of the image sensor 1000 (adjusting of a read-out timing, etc.) in order to compensate for a negative influence of the motion. The image stabilizer 1140 may sense the movement of the camera module ED80 or the electronic apparatus ED01 by using a gyro sensor or an acceleration sensor provided in or out of the camera module ED80. The image stabilizer 1140 may be implemented as an optical type.

The memory 1150 may store some or entire data of the image obtained through the image sensor 1000 for next image processing operation. In an example case in which a plurality of images are obtained at a high speed, obtained original data (Bayer-patterned data, high-resolution data, etc.) is stored in the memory 1150, and a low-resolution image is only displayed. Then, original data of a selected image (user selection, etc.) may be transferred to the image signal processor 1160. The memory 1150 may be integrated with the memory ED30 of the electronic apparatus ED01, or may include an additional memory that is operated independently.

The image signal processor 1160 may perform image treatment on the image obtained through the image sensor 1000 or the image data stored in the memory 1150. The image treatments may include a depth map generation, a three-dimensional modeling, a panorama generation, extraction of features, an image combination, and/or an image compensation (noise reduction, resolution adjustment, brightness adjustment, blurring, sharpening, softening, etc.). The image signal processor 1160 may perform controlling (exposure time control, read-out timing control, etc.) of the elements (image sensor 1000, etc.) included in the camera module ED80. Also, the image signal processor 1160 may generate a full-color image by executing the above demosaic algorithm. In an example case in which the demosaic algorithm is executed to generate the full-color image, the image signal processor 1160 may reconstruct most of the spatial resolution information by using an image signal of a green channel or yellow channel having high spatial sampling rate.

The image processed by the image signal processor 1160 may be stored again in the memory 1150 for additional process, or may be provided to an external element of the camera module ED80 (e.g., the memory ED30, the display device ED60, the electronic apparatus ED02, the electronic apparatus ED04, the server ED08, etc.). The image signal processor 1160 may be integrated with the processor ED20, or may be configured as an additional processor that is independently operated from the processor ED20. In an example case in which the image signal processor 1160 is configured as an additional processor separately from the processor ED20, the image processed by the image signal processor 1160 undergoes through an additional image treatment by the processor ED20 and then may be displayed on the display device ED60.

Also, the image signal processor 1160 may receive two output signals independently from the adjacent photosensitive cells in each pixel or sub-pixel of the image sensor 1000, and may generate an auto-focusing signal from a difference between the two output signals. The image signal processor 1160 may control the lens assembly 1110 so that the focus of the lens assembly 1110 may be accurately formed on the surface of the image sensor 1000 based on the auto-focusing signal.

The electronic apparatus ED01 may further include one or a plurality of camera modules having different properties or functions. The camera module may include elements similar to those of the camera module ED80 of FIG. 20, and the image sensor included in the camera module may be implemented as a charge coupled device (CCD) sensor and/or a complementary metal oxide semiconductor (CMOS) sensor and may include one or a plurality of sensors selected from the image sensors having different properties, such as an RGB sensor, a black and white (BW) sensor, an IR sensor, or a UV sensor. In this case, one of the plurality of camera modules ED80 may include a wide-angle camera and another camera module ED80 may include a telephoto camera. Similarly, one of the plurality of camera modules ED80 may include a front camera and another camera module ED80 may include a rear camera.

Figure 21:
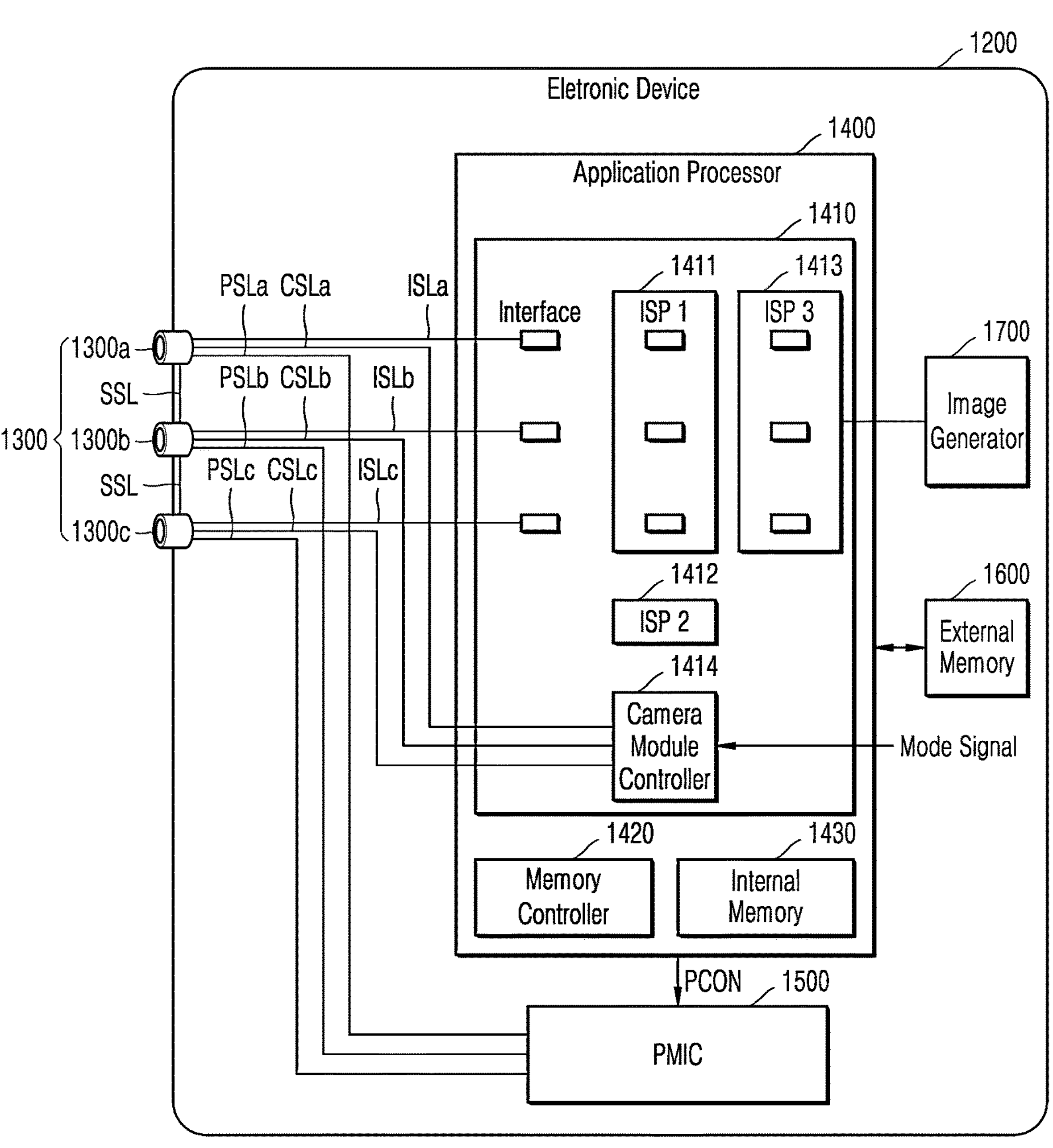
FIG. 21 is a block diagram of an electronic apparatus including a multi-camera module.
Figure 22:
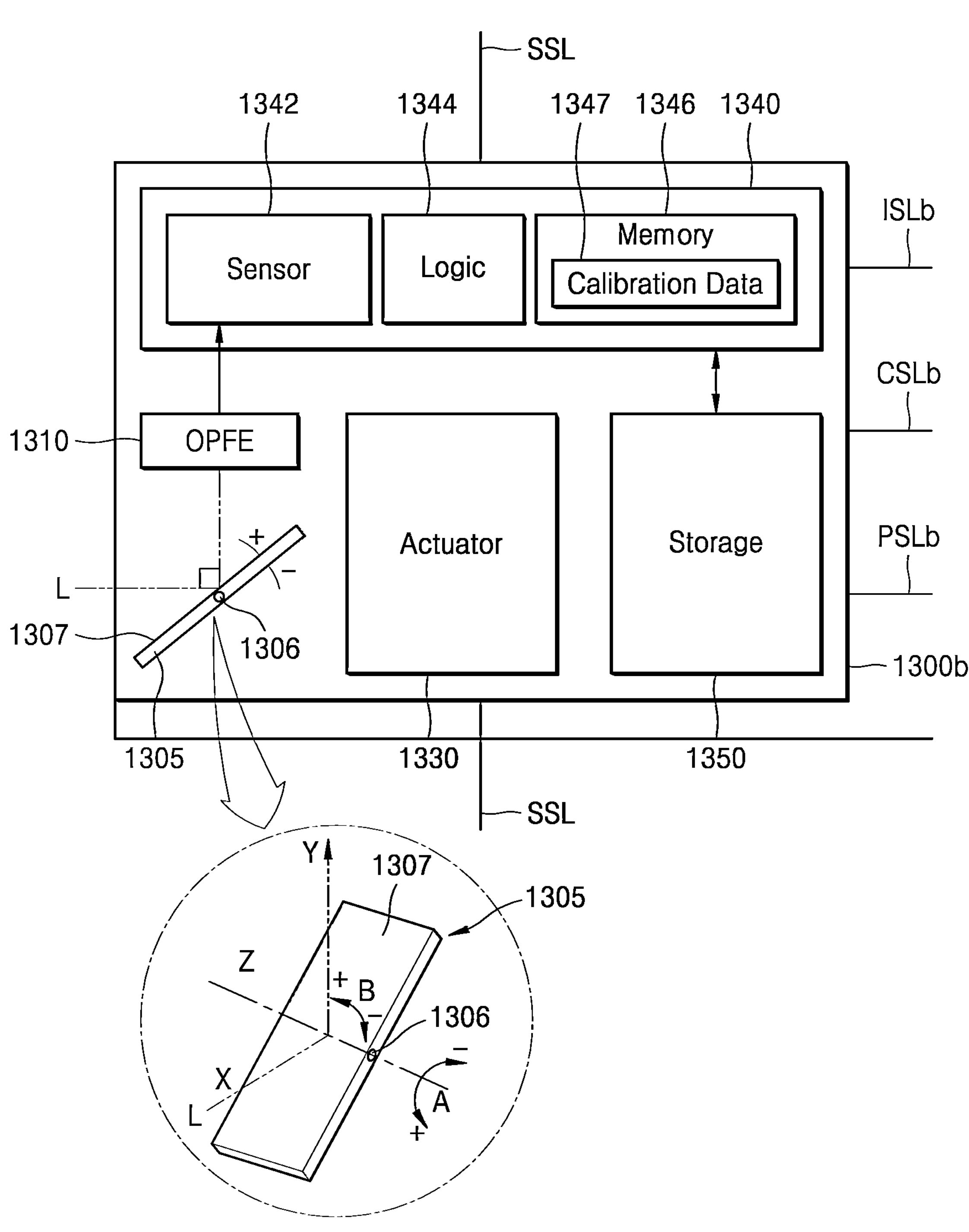
FIG. 22 is a detailed block diagram of a multi-camera module in the electronic device of FIG. 21.

FIG. 21 is a block diagram of an electronic device 1200 including a multi-camera module, and FIG. 22 is a detailed block diagram of the camera module in the electronic device shown in FIG. 21.

Referring to FIG. 21, the electronic device 1200 may include a camera module group 1300, an application processor 1400, a power management integrated circuit (PMIC) 1500, an external memory 1600, and an image generator 1700.

The camera module group 1300 may include a plurality of camera modules **1300*a*, 1300*b*, and 1300*c*. Although the drawings show an example in which three camera modules 1300*a*, 1300*b*, and 1300*c* are arranged, one or more embodiments are not limited thereto. In some embodiments, the camera module group 1300 may be modified to include only two camera modules. Also, in some embodiments, the camera module group 1300** may be modified to include n (n is 4 or greater natural number) camera modules.

Hereinafter, detailed configuration of one camera module **1300*b* is described in detail below with reference to FIG. 22, but the description provided below may be also applied to the other camera modules 1300***a* and 1300*c* according to the embodiments.

Referring to FIG. 22, the camera module 1300*b* may include a prism 1305, an optical path folding element (OPFE) 1310, an actuator 1330, an image sensing device 1340, and a storage 1350.

The prism 1305 may include a reflecting surface 1307 having a light-reflecting material and may deform a path of light L incident from outside.

In some embodiments, the prism 1305 may change the path of the light L incident in the first direction (X-direction) into a second direction (Y-direction) that is perpendicular to the first direction (X-direction). Also, the prism 1305 may rotate the reflecting surface 1307 having the light-reflecting material about a center axis 1106 in a direction A, or about the center axis 1306 in a direction B so that the path of the light L incident in the first direction (X-direction) may be changed to the second direction (Y-direction) perpendicular to the first direction (X-direction). Here, the OPFE 1310 may also move in the third direction (Z-direction) that is perpendicular to the first direction (X-direction) and the second direction (Y-direction).

In some embodiments, as shown in the drawings, the maximum rotation angle of the prism 1305 in the direction A is 15° or less in the positive A direction and is greater than 15° in the negative A direction, but the embodiments are not limited thereto.

In some embodiments, the prism 1305 may be moved by the angle of about 20°, or between 10° to 20° or 15° to 20° in the positive or negative B direction. Here, the moving angle is the same in the positive or negative B direction, or may be similar within a range of about 1°.

In some embodiments, the prism 1305 may move the reflecting surface 1307 of the light-reflective material in the third direction (e.g., Z direction) that is parallel to the direction in which the center axis 1306 extends.

The OPFE 1310 may include, for example, optical lenses formed as m groups (here, m is a natural number). Here, m lenses move in the second direction (Y-direction) and may change an optical zoom ratio of the camera module 1300*b*. In an example case in which a basic optical zoom ratio of the camera module 1300*b* is Z and m optical lenses included in the OPFE 1310 move, the optical zoom ratio of the camera module 1300*b* may be changed to 3Z, 5Z, or 10Z or greater.

The actuator 1330 may move the OPFE 1310 or the optical lens (hereinafter, referred to as optical lens) to a certain position. For example, the actuator 1330 may adjust the position of the optical lens so that the image sensor 1342 may be located at a focal length of the optical lens for exact sensing operation.

An image sensing device 1340 may include the image sensor 1342, a control logic 1344, and a memory 1346. The image sensor 1342 may sense an image of a sensing target by using the light L provided through the optical lens. The control logic 1344 may control the overall operation of the camera module 1300*b*. For example, the control logic 1344 may control the operations of the camera module 1300*b* according to a control signal provided through a control signal line CSLb.

For example, the image sensor 1342 may include the color separating lens array or the nano-photonic lens array described above. The image sensor 1342 may receive more signals separated according to wavelengths in each pixel by using the color separating lens array based on the nano-structures. Due to the above effects, the optical intensity required to generate high quality images of high resolution and under the low illuminance may be secured.

The memory 1346 may store information that is necessary for the operation of the camera module 1300*b*, e.g., calibration data 1347. The calibration data 1347 may include information that is necessary to generate image data by using the light L provided from outside through the camera module 1300*b*. The calibration data 1347 may include, for example, information about the degree of rotation described above, information about the focal length, information about an optical axis, etc. In an example case in which the camera module 1300*b* is implemented in the form of a multi-state camera of which the focal length is changed according to the position of the optical lens, the calibration data 1347 may include information related to focal length values of the optical lens according to each position (or state) and auto-focusing.

The storage unit 1350 may store image data sensed through the image sensor 1342. The storage unit 1350 may be provided out of the image sensing device 1340 and may be stacked with a sensor chip included in the image sensing device 1340. In some embodiments, the storage unit 1350 may be implemented as electrically erasable programmable read-only memory (EEPROM), but one or more embodiments are not limited thereto.

Referring to FIGS. 21 and 22, in some embodiments, each of the plurality of camera modules 1300*a*, 1300*b*, and 1300*c* may include the actuator 1330. Accordingly, each of the plurality of camera modules 1300*a*, 1300*b*, and 1300*c* may include the calibration data 1347 that is the same as or different from the others, according to the operation of the actuator 1330 included therein.

In some embodiments, one (for example, 1300*b*) of the plurality of camera modules 1300*a*, 1300*b*, and 1300*c* may be a camera module in a folded lens type including the prism 1305 and the OPFE 1310 described above, and the other camera modules (for example, 1300*a* and 1300*c*) may be vertical type camera modules not including the prism 1305 and the OPFE 1310. However, the disclosure is not limited thereto.

In some embodiments, one (for example, 1300*c*) of the plurality of camera modules 1300*a*, 1300*b*, and 1300*c* may be a depth camera of a vertical type, which extracts depth information by using infrared ray (IR).

In some embodiments, at least two camera modules (e.g., 1300*a* and 1300*b*) from among the plurality of camera module 1300*a*, 1300*b*, and 1300*c* may have different fields of view. In this case, for example, the optical lenses of the at least two camera modules (e.g., 1300*a* and 1300*b*) from among the plurality of camera modules 1300*a*, 1300*b*, and 1300*c* may be different from each other, but one or more embodiments are not limited thereto.

Also, in some embodiments, the plurality of camera modules 1300*a*, 1300*b*, and 1300*c* may have different fields of view from one another. In this case, the optical lenses respectively included in the plurality of camera modules 1300*a*, 1300*b*, and 1300*c* may be different from one another, but the inventive concept is not limited thereto.

In some embodiments, the plurality of camera modules 1300*a*, 1300*b*, and 1300*c* may be physically isolated from one another. That is, the sensing region of one image sensor 1342 may not be divided and used by the plurality of camera modules 1300*a*, 1300*b*, and 1300*c*, but the plurality of camera modules 1300*a*, 1300*b*, and 1300*c* may each have an independent image sensor 1342 provided therein.

Referring back to FIG. 21, the application processor 1400 may include an image processing device 1410, a memory controller 1420, and an internal memory 1430. The application processor 1400 may be separately implemented from the plurality of camera modules 1300*a*, 1300*b*, and 1300*c*. For example, the application processor 1400 and the plurality of camera modules 1300*a*, 1300*b*, and 1300*c* may be separately implemented as separate semiconductor chips.

The image processing device 1410 may include a plurality of image processors 1411, 1412, and 1413, and a camera module controller 1414.

The image data generated by each of the camera modules 1300*a*, 1300*b*, and 1300*c* may be provided to the image processing device 1410 via separate image signal lines, respectively. The image data transfer may be carried out by using a camera serial interface (CSI) based on a mobile industry processor interface (MIPI), for example, but is not limited thereto.

The image data transferred to the image processing device 1410 may be stored in an external memory 1600 before being transferred to the image processors 1411 and 1412. The image data stored in the external memory 1600 may be provided to the image processor 1411 and/or the image processor 1412. The image processor 1411 may correct the image data in order to generate video. The image processor 1412 may correct the image data in order to generate still images. For example, the image processors 1411 and 1412 may perform a pre-processing operation such as a color calibration, a gamma calibration on the image data.

The image processor 1411 may include sub-processors. In an example case in which the number of sub-processors is equal to the number of camera modules 1300*a*, 1300*b*, and 1300*c*, each of the sub-processors may process the image data provided from one camera module. In an example case in which the number of sub-processors is less than the number of camera modules 1300*a*, 1300*b*, and 1300*c*, at least one of the sub-processors may process the image data provided from a plurality of camera module by using a timing-sharing process. The image data processed by the image processor 1411 and/or the image processor 1412 may be stored in the external memory 1600 before being transferred to the image processor 1413. The image data stored in the external memory 1600 may be transferred to the image processor 1412. The image processor 1412 may perform a post-processing operation such as a noise calibration, a sharpen calibration, etc. on the image data.

The image data processed in the image processor 1413 may be provided to the image generator 1700. The image generator 1700 may generate a final image by using the image data provided from the image processor 1413 according to image generating information or a mode signal.

In detail, the image generator 1700 may generate a final image by merging at least parts of the image data generated by the camera modules 1300*a*, 1300*b*, and 1300*c* having different fields of view, according to image generating information or the mode signal. Also, the image generator 1700 may generate the output image by selecting one of pieces of image data generated by the camera modules 1300*a*, 1300*b*, and 1300*c* having different fields of view, according to image generating information or the mode signal.

In some embodiments, the image generating information may include a zoom signal or a zoom factor. Also, in some embodiments, the mode signal may be, for example, a signal based on a mode selected by a user.

In an example case in which the image generating information is a zoom signal (zoom factor) and the camera modules 1300*a*, 1300*b*, and 1300*c* have different fields of view (angles of view) from one another, the image generator 1700 may perform different operations according to the kind of zoom signal. In an example case in which the zoom signal is a first signal, the image data output from the camera module 1300*a* is merged with the image data output from the camera module 1300*c*, and then, the output image may be generated by using the merged image signal and the image data output from the camera module 1300*b* and not used in the merge. In an example case in which the zoom signal is a second signal that is different from the first signal, the image generator 1700 may not perform the image data merging, and then, may generate the output image by selecting one piece of the image data output respectively from the camera modules 1300*a*, 1300*b*, and 1300*c*. However, one or more embodiments are not limited thereto, and the method of processing the image data may be modified as necessary.

The camera module controller 1414 may provide each of the camera modules 1300*a*, 1300*b*, and 1300*c* with a control signal. The control signals generated by the camera module controller 1414 may be provided to corresponding camera modules 1300*a*, 1300*b*, and 1300*c* via control signal lines CSLa, CSLb, and CSLc separated from one another.

In some embodiments, the control signal provided to the plurality of camera modules 1300*a*, 1300*b*, and 1300*c* from the camera module controller 1414 may include mode information according to the mode signal. The plurality of camera modules 1300*a*, 1300*b*, and 1300*c* may operate in a first operation mode and a second operation mode in relation to the sensing speed, based on the mode information.

In the first operation mode, the plurality of camera modules 1300*a*, 1300*b*, and 1300*c* may generate the image signal at a first speed (for example, generating an image signal of a first frame rate), encodes the image signal at a second speed that is faster than the first speed (for example, encoding the image signal of a second frame rate that is greater than the first frame rate), and transfers the encoded image signal to the application processor 1400. Here, the second speed may be 30 times faster than the first speed or less.

The application processor 1400 may store the received image signal, that is, the encoded mage signal, in the internal memory 1430 provided therein or the external memory 1600 outside the application processor 1400, and after that, reads and decodes the encoded signal from the internal memory 1430 or the external memory 1600, and may display the image data generated based on the decoded image signal. For example, the image processors 1411 and 1412 in the image processing device 1410 may perform decoding, and may perform image processing on the decoded image signals.

In the second operation mode, the plurality of camera modules 1300*a*, 1300*b*, and 1300*c* generates an image signal at a third speed that is slower than the first speed (for example, generating the image signal of a third frame rate that is lower than the first frame rate), and may transfer the image signal to the application processor 1400. The image signal provided to the application processor 1400 may be a signal that is not encoded. The application processor 1400 may perform the image processing of the received image signal or store the image signal in the internal memory 1430 or the external memory 1600.

The PMIC 1500 may supply the power, for example, the power voltage, to each of the plurality of camera modules 1300*a*, 1300*b*, and 1300*c*. For example, the PMIC 1500 may supply the first power to the camera module 1300*a* via a power signal line PSLa, the second power to the camera module 1300*b* via a power signal line PSLb, and the third power to the camera module 1300*c* via a power signal line PSLc, under the control of the application processor 1400.

The PMIC 1500 may generate the power corresponding to each of the plurality of camera modules 1300*a*, 1300*b*, and 1300*c* and may adjust the power level, based on a power control signal PCON from the application processor 1400. The power control signal PCON may include a power adjusting signal for each operation mode of the plurality of camera modules 1300*a*, 1300*b*, and 1300*c*. For example, the operation mode may include a low power mode, and the power control signal PCON may include information about the camera module operating in the low-power mode and set power level. The levels of the power provided to the plurality of camera modules 1300*a*, 1300*b*, and 1300*c* may be equal to or different from each other. Also, the power level may be dynamically changed.

In the image sensor according to the embodiment, the arrangement period and the arrangement position of the nano-structures in the nano-photonic lens array may be differently selected according to color channels. For example, by differently selecting the arrangement period of the nano-structures in the nano-photonic lens array according to the color channels, the contrast ratio of the auto-focusing signal may be improved. Also, the positions of the nano-structures in the nano-photonic lens array may be differently aligned according to the color channels, the difference between the brightness of the color channels may be reduced.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. An image sensor comprising:

a sensor substrate comprising a first pixel group and a second pixel group, the first pixel group comprising a plurality of first pixels that are two-dimensionally arranged in a first direction and a second direction perpendicular to the first direction, and the second pixel group comprising a plurality of second pixels that are two-dimensionally arranged in the first direction and the second direction;

a nano-photonic lens array comprising a first region and a second region, the first region facing the first pixel group in a third direction perpendicular to the first direction and the second direction, and the second region facing the second pixel group in the third direction; and a color filter layer provided between the sensor substrate and the nano-photonic lens array, the color filter layer comprising a first color filter and a second color filter, the first color filter facing the first pixel group and the first region in the third direction and configured to transmit light of a first wavelength band, and the second color filter facing the second pixel group and the second region in the third direction and configured to transmit light of a second wavelength band that is different from the first wavelength band, wherein the first region comprises a plurality of nano-structures that are two-dimensionally arranged with a first period, wherein the second region comprises a plurality of nano-structures that are two-dimensionally arranged with a second period, wherein the second period is less than the first period, wherein each of the first region and the second region comprises a first lens, a second lens adjacent to the first lens in the first direction, a third lens adjacent to the first lens in the second direction, and a fourth lens adjacent to the third lens in the first direction, wherein each of the first lens, the second lens, the third lens, and the fourth lens in the first region comprises a plurality of first nano-structures that are two-dimensionally arranged with the first period, wherein each of the first lens, the second lens, the third lens, and the fourth lens in the second region comprises a plurality of second nano-structures that are two-dimensionally arranged with the second period, and wherein, in the first region:

a first gap between a nano-structure arranged at an edge adjacent to the second lens in the first direction, from among the plurality of first nano-structures in the first lens, and a nano-structure arranged at an edge adjacent to the first lens in the first direction, from among the plurality of first nano-structures in the second lens, in the first direction is greater than the first period, and a second gap between a nano-structure arranged at an edge adjacent to the fourth lens in the first direction, from among the plurality of first nano-structures in the third lens, and a nano-structure arranged at an edge adjacent to the third lens in the first direction, from among the plurality of first nano-structures in the fourth lens, in the first direction is greater than the first period.

2. The image sensor of claim 1, wherein the first gap is different from the second gap.

3. The image sensor of claim 1, wherein, in the first region, a third gap between a nano-structure arranged at an edge adjacent to the third lens in the second direction, from among the plurality of first nano-structures in the first lens, and a nano-structure arranged at an edge adjacent to the first lens in the second direction, from among the plurality of first nano-structures in the third lens, in the second direction is equal to the first period, and a fourth gap between a nano-structure arranged at an edge adjacent to the fourth lens in the second direction, from among the plurality of first nano-structures in the second lens, and a nano-structure arranged at an edge adjacent to the second lens in the second direction, from among the plurality of first nano-structures in the fourth lens, in the second direction is equal to the first period.

4. The image sensor of claim 1, wherein, in the first region, a third gap between a nano-structure arranged at an edge adjacent to the third lens in the second direction, from among the plurality of first nano-structures in the first lens, and a nano-structure arranged at an edge adjacent to the first lens in the second direction, from among the plurality of first nano-structures in the third lens, in the second direction is different from the first period, and a fourth gap between a nano-structure arranged at an edge adjacent to the fourth lens in the second direction, from among the plurality of first nano-structures in the second lens, and a nano-structure arranged at an edge adjacent to the second lens in the second direction, from among the plurality of first nano-structures in the fourth lens, in the second direction is different from the first period.

5. The image sensor of claim 1, wherein, in the second region, a fifth gap between a nano-structure arranged at an edge adjacent to the second lens in the first direction, from among the plurality of second nano-structures in the first lens, and a nano-structure arranged at an edge adjacent to the first lens in the first direction, from among the plurality of second nano-structures in the second lens, in the first direction is less than the second period, and a sixth gap between a nano-structure arranged at an edge adjacent to the fourth lens in the first direction, from among the plurality of second nano-structures in the third lens, and a nano-structure arranged at an edge adjacent to the third lens in the first direction, from among the plurality of second nano-structures in the fourth lens, in the first direction is less than the second period.

6. The image sensor of claim 5, wherein the fifth gap is different from the sixth gap.

7. The image sensor of claim 5, wherein, in the second region, a seventh gap between a nano-structure arranged at an edge adjacent to the third lens in the second direction, from among the plurality of second nano-structures in the first lens, and a nano-structure arranged at an edge adjacent to the first lens in the second direction, from among the plurality of second nano-structures in the third lens, in the second direction is less than the second period, an eighth gap between a nano-structure arranged at an edge adjacent to the fourth lens in the second direction, from among the plurality of second nano-structures in the second lens, and a nano-structure arranged at an edge adjacent to the second lens in the second direction, from among the plurality of second nano-structures in the fourth lens, in the second direction is less than the second period, and wherein the seventh gap is different from the eighth gap.

8. The image sensor of claim 1, wherein each of the first pixel group and the second pixel group comprises a first sub-group, a second sub-group, a third sub-group, and a fourth sub-group arranged in a 2×2 array, and each of the first sub-group, the second sub-group, the third sub-group, and the fourth sub-group in each of the first pixel group and the second pixel group comprises a plurality of independent pixels arranged in a 2×2 array.

9. The image sensor of claim 8, wherein the first lens, the second lens, the third lens, and the fourth lens in the first region are arranged respectively to face the first sub-group, the second sub-group, the third sub-group, and the fourth sub-group of the first pixel group in the third direction, and the first lens, the second lens, the third lens, and the fourth lens in the second region are arranged respectively to face the first sub-group, the second sub-group, the third sub-group, and the fourth sub-group of the second pixel group in the third direction.

10. The image sensor of claim 1, wherein the sensor substrate further comprises a third pixel group and a fourth pixel group, the third pixel group comprising a plurality of third pixels that are two-dimensionally arranged in the first direction and the second direction, and the fourth pixel group comprising a plurality of fourth pixels that are two-dimensionally arranged in the first direction and the second direction, the nano-photonic lens array further comprises a third region and a fourth region, the third region facing the third pixel group in the third direction and the fourth region facing the fourth pixel group in the third direction, the color filter layer comprises a third color filter and a fourth color filter, the third color filter facing the third pixel group and the third region in the third direction and configured to transmit light of a third wavelength band different from the first and second wavelength bands, and the fourth color filter facing the fourth pixel group and the fourth region in the third direction and configured to transmit light of the first wavelength band, the third region comprises a plurality of nano-structures that are two-dimensionally arranged with a third period, the fourth region comprises a plurality of nano-structures that are two-dimensionally arranged with a fourth period, and the second period is less than the third period and the fourth period.

11. The image sensor of claim 10, wherein the first period, the third period, and the fourth period are equal to one another.

12. The image sensor of claim 10, wherein the first period and the fourth period are less than the third period.

13. The image sensor of claim 10, wherein each of the third region and the fourth region comprises a first lens, a second lens, a third lens, and a fourth lens arranged in a 2×2 array, each of the first lens, the second lens, the third lens, and the fourth lens in the third region comprises a plurality of nano-structures that are two-dimensionally arranged with the third period, and each of the first lens, the second lens, the third lens, and the fourth lens in the fourth region comprises a plurality of nano-structures that are two-dimensionally arranged with the fourth period.

14. The image sensor of claim 13, wherein, in the third region, a ninth gap between a nano-structure arranged at an edge adjacent to the second lens in the first direction, from among the plurality of nano-structures in the first lens, and a nano-structure arranged at an edge adjacent to the first lens in the first direction, from among the plurality of nano-structures in the second lens, in the first direction is equal to the third period, a tenth gap between a nano-structure arranged at an edge adjacent to the fourth lens in the first direction, from among the plurality of nano-structures in the third lens, and a nano-structure arranged at an edge adjacent to the third lens in the first direction, from among the plurality of nano-structures in the fourth lens, in the first direction is equal to the third period, an eleventh gap between a nano-structure arranged at an edge adjacent to the third lens in the second direction, from among the plurality of nano-structures in the first lens, and a nano-structure arranged at an edge adjacent to the first lens in the second direction, from among the plurality of nano-structures in the third lens, in the second direction is equal to the third period, and a twelfth gap between a nano-structure arranged at an edge adjacent to the fourth lens in the second direction, from among the plurality of nano-structures in the second lens, and a nano-structure arranged at an edge adjacent to the second lens in the second direction, from among the plurality of nano-structures in the fourth lens, in the second direction is equal to the third period.

15. The image sensor of claim 13, wherein, in the fourth region, a thirteenth gap between a nano-structure arranged at an edge adjacent to the second lens in the first direction, from among the plurality of nano-structures in the first lens, and a nano-structure arranged at an edge adjacent to the first lens in the first direction, from among the plurality of nano-structures in the second lens, in the first direction is equal to the fourth period, a fourteenth gap between a nano-structure arranged at an edge adjacent to the fourth lens in the first direction, from among the plurality of nano-structures in the third lens, and a nano-structure arranged at an edge adjacent to the third lens in the first direction, from among the plurality of nano-structures in the fourth lens, in the first direction is equal to the fourth period, a fifteenth gap between a nano-structure arranged at an edge adjacent to the third lens in the second direction, from among the plurality of nano-structures in the first lens, and a nano-structure arranged at an edge adjacent to the first lens in the second direction, from among the plurality of nano-structures in the third lens, in the second direction is greater than the fourth period, and a sixteenth gap between a nano-structure arranged at an edge adjacent to the fourth lens in the second direction, from among the plurality of nano-structures in the second lens, and a nano-structure arranged at an edge adjacent to the second lens in the second direction, from among the plurality of nano-structures in the fourth lens, in the second direction is greater than the fourth period.

16. The image sensor of claim 1, wherein the plurality of first pixels are grouped and arranged in a 2×2 array, the plurality of second pixels are grouped and arranged in a 2×2 array, the first region comprises a lens facing all of the plurality of first pixels in the first pixel group, and the second region comprises a lens facing all of the plurality of second pixels in the second pixel group.

17. An electronic apparatus comprising:

a lens assembly configured to form an optical image of a subject;

an image sensor configured to convert the optical image formed by the lens assembly into an electrical signal; and a processor configured to process a signal generated by the image sensor, wherein the image sensor comprises:

a sensor substrate comprising a first pixel group and a second pixel group, each of the first pixel group and the second pixel group comprising a plurality of pixels that are two-dimensionally arranged in a first direction and a second direction perpendicular to the first direction;

a nano-photonic lens array comprising a first region and a second region, the first region facing the first pixel group in a third direction perpendicular to the first direction and the second direction, and the second region facing the second pixel group in the third direction; and a color filter layer provided between the sensor substrate and the nano-photonic lens array, the color filter layer comprising a first color filter and a second color filter, the first color filter facing the first pixel group and the first region in the third direction and configured to transmit light of a first wavelength band, and the second color filter facing the second pixel group and the second region in the third direction and configured to transmit light of a second wavelength band that is different from the first wavelength band, wherein the first region comprises a plurality of nano-structures that are two-dimensionally arranged with a first period, wherein the second region comprises a plurality of nano-structures that are two-dimensionally arranged with a second period, and wherein the second period is less than the first period, wherein each of the first region and the second region comprises a first lens, a second lens adjacent to the first lens in the first direction, a third lens adjacent to the first lens in the second direction, and a fourth lens adjacent to the third lens in the first direction, wherein each of the first lens, the second lens, the third lens, and the fourth lens in the first region comprises a plurality of first nano-structures that are two-dimensionally arranged with the first period, wherein each of the first lens, the second lens, the third lens, and the fourth lens in the second region comprises a plurality of second nano-structures that are two-dimensionally arranged with the second period, and wherein, in the first region:

a first gap between a nano-structure arranged at an edge adjacent to the second lens in the first direction, from among the plurality of first nano-structures in the first lens, and a nano-structure arranged at an edge adjacent to the first lens in the first direction, from among the plurality of first nano-structures in the second lens, in the first direction is greater than the first period, and a second gap between a nano-structure arranged at an edge adjacent to the fourth lens in the first direction, from among the plurality of first nano-structures in the third lens, and a nano-structure arranged at an edge adjacent to the third lens in the first direction, from among the plurality of first nano-structures in the fourth lens, in the first direction is greater than the first period.

18. An image sensor comprising:

a sensor substrate comprising a first pixel group and a second pixel group, the first pixel group comprising a plurality of first pixels that are two-dimensionally arranged in a first direction and a second direction perpendicular to the first direction, and the second pixel group comprising a plurality of second pixels that are two-dimensionally arranged in the first direction and the second direction;

a nano-photonic lens array comprising a first region overlapping the first pixel group in a third direction perpendicular to the first direction and the second direction, and a second region overlapping the second pixel group in the third direction; and a color filter layer provided between the sensor substrate and the nano-photonic lens array, the color filter layer comprising a first color filter overlapping the first pixel group in the third direction, and a second color filter overlapping the second pixel group in the third direction, wherein the first region comprises a plurality of first nano-structures and the second region comprises a plurality of second nano-structures, wherein the plurality of first nano-structures are arranged in the first direction to have a first period, and wherein the plurality of second nano-structures are arranged in the first direction to have a second period different from the first period, wherein each of the first region and the second region comprises a first lens, a second lens adjacent to the first lens in the first direction, a third lens adjacent to the first lens in the second direction, and a fourth lens adjacent to the third lens in the first direction, wherein each of the first lens, the second lens, the third lens, and the fourth lens in the first region comprises respective ones of the plurality of first nano-structures that are two-dimensionally arranged with the first period, wherein each of the first lens, the second lens, the third lens, and the fourth lens in the second region comprises respective ones of the plurality of second nano-structures that are two-dimensionally arranged with the second period, and wherein, in the first region:

a first gap between a nano-structure arranged at an edge adjacent to the second lens in the first direction, from among the plurality of first nano-structures in the first lens, and a nano-structure arranged at an edge adjacent to the first lens in the first direction, from among the plurality of first nano-structures in the second lens, in the first direction is greater than the first period, and a second gap between a nano-structure arranged at an edge adjacent to the fourth lens in the first direction, from among the plurality of first nano-structures in the third lens, and a nano-structure arranged at an edge adjacent to the third lens in the first direction, from among the plurality of first nano-structures in the fourth lens, in the first direction is greater than the first period.

* * * * *